US012552165B2

(12) United States Patent
Shingyoh et al.

(10) Patent No.: US 12,552,165 B2
(45) Date of Patent: Feb. 17, 2026

(54) DISCHARGE HEAD, DISCHARGE HEAD UNIT, DISCHARGE APPARATUS, AND PRINTER

(71) Applicants: Masaya Shingyoh, Kanagawa (JP); Kouichi Takahashi, Kanagawa (JP); Yoshinori Bandoh, Kanagawa (JP)

(72) Inventors: Masaya Shingyoh, Kanagawa (JP); Kouichi Takahashi, Kanagawa (JP); Yoshinori Bandoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 154 days.

(21) Appl. No.: 18/604,509

(22) Filed: Mar. 14, 2024

(65) Prior Publication Data

US 2024/0326430 A1 Oct. 3, 2024

(30) Foreign Application Priority Data

Mar. 27, 2023 (JP) ................................ 2023-049282

(51) Int. Cl.
*B41J 2/14* (2006.01)
*B41J 2/165* (2006.01)

(52) U.S. Cl.
CPC ............ *B41J 2/1433* (2013.01); *B41J 2/165* (2013.01)

(58) Field of Classification Search
CPC ...... B41J 2/1433; B41J 2/165; B41J 2/14233; B41J 2002/14475
See application file for complete search history.

(56) References Cited

U.S. PATENT DOCUMENTS

2013/0050346 A1 2/2013 Takeuchi et al.
2020/0156374 A1 5/2020 Bandoh
2020/0298582 A1 9/2020 Bandoh
2021/0094298 A1* 4/2021 Bandoh .................... B41J 2/155
2021/0260874 A1 8/2021 Bandoh
2022/0143977 A1 5/2022 Bandoh
2023/0241890 A1 8/2023 Shingyoh et al.

FOREIGN PATENT DOCUMENTS

JP 2009-051081 A 3/2009
JP 2012-196792 A 10/2012
JP 2016-165886 A 9/2016

* cited by examiner

*Primary Examiner* — Bradley W Thies
(74) *Attorney, Agent, or Firm* — XSENSUS LLP

(57) ABSTRACT

A discharge head includes multiple nozzles and a recess. The multiple nozzles are arrayed in a first direction. A liquid is dischargeable from the multiple nozzles in a discharge direction. The recess is recessed from the nozzle face in a second direction, is disposed at one side of a nozzle row in a third direction, and has a wall face extending in the first direction and the second direction. The wall face is disposed between the nozzle row and a side face of the discharge head. The discharge head has an inner region in which the multiple nozzles are arrayed and an outer region outside the inner region in the first direction. The recess covers a boundary region between the inner region and the outer region. The wall face has a first height in the outer region and a second height lower than the first height in the inner region.

20 Claims, 22 Drawing Sheets

FIG. 5 COMPARATIVE EXAMPLE
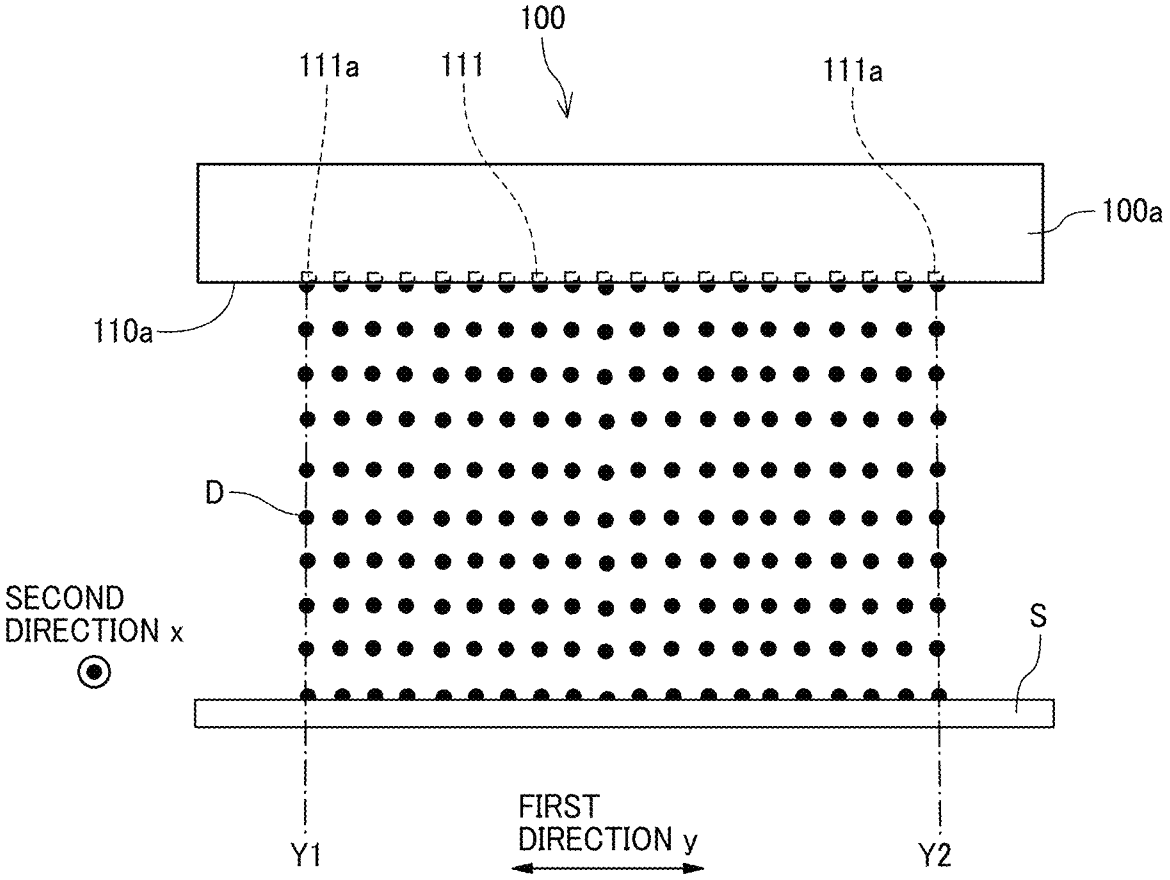

FIG. 6A COMPARATIVE EXAMPLE
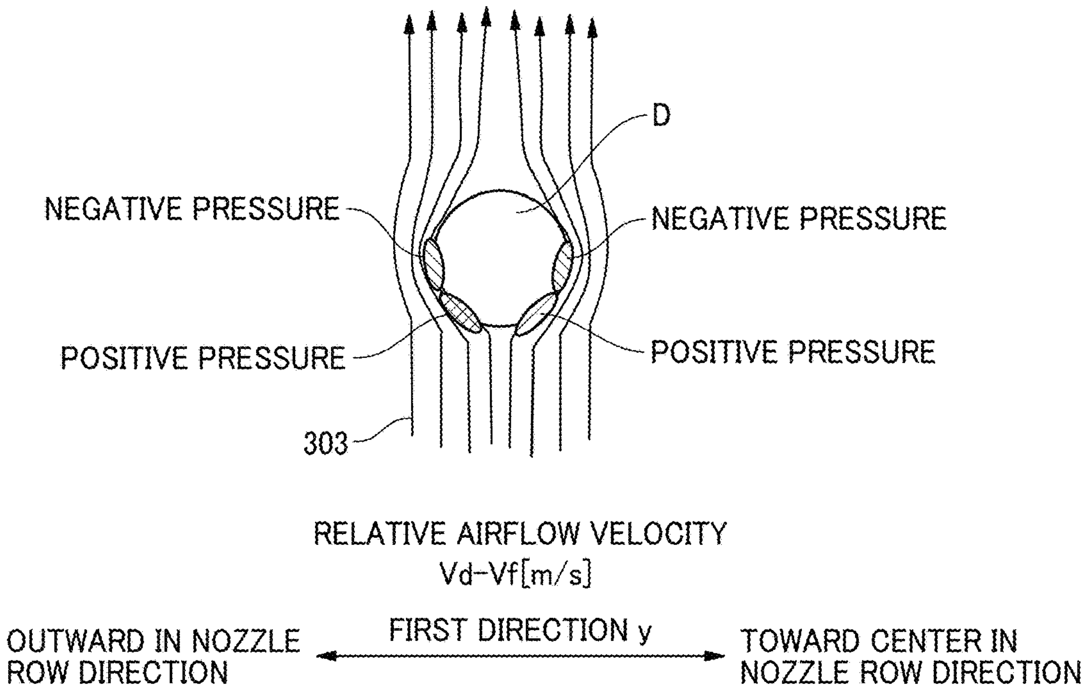
FIG. 6B COMPARATIVE EXAMPLE
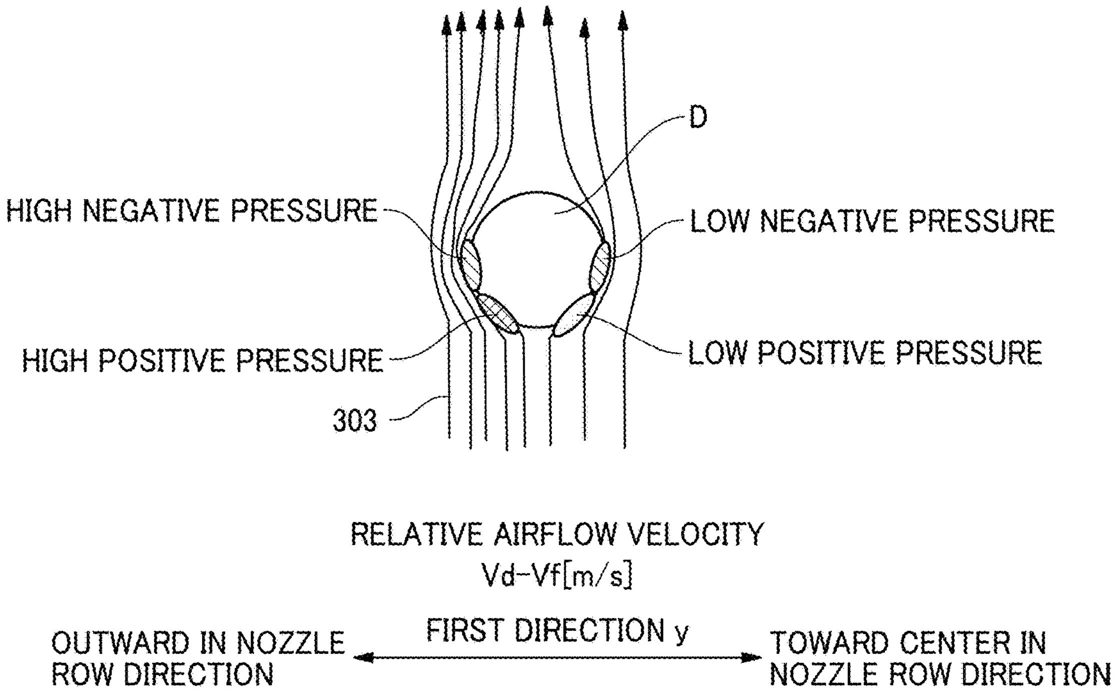

FIG. 7 COMPARATIVE EXAMPLE
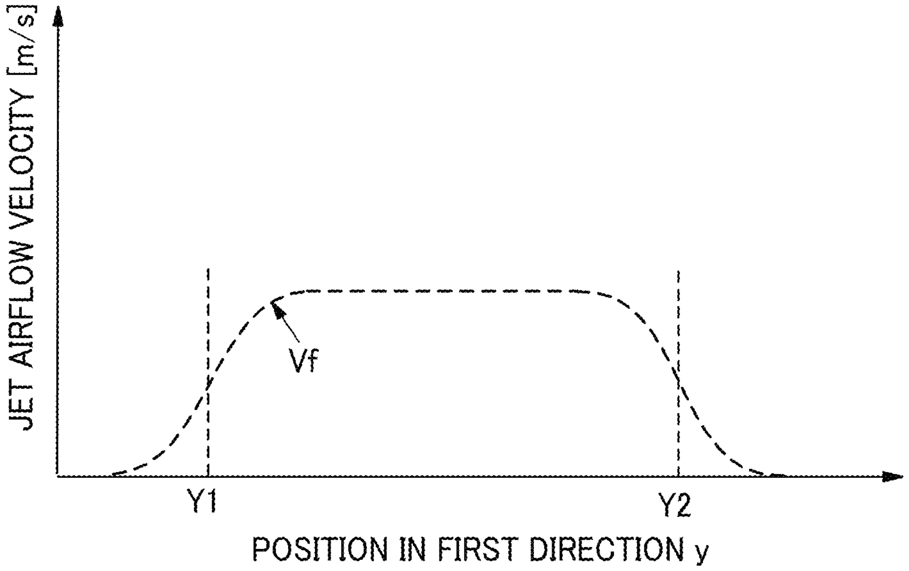
FIG. 8 COMPARATIVE EXAMPLE
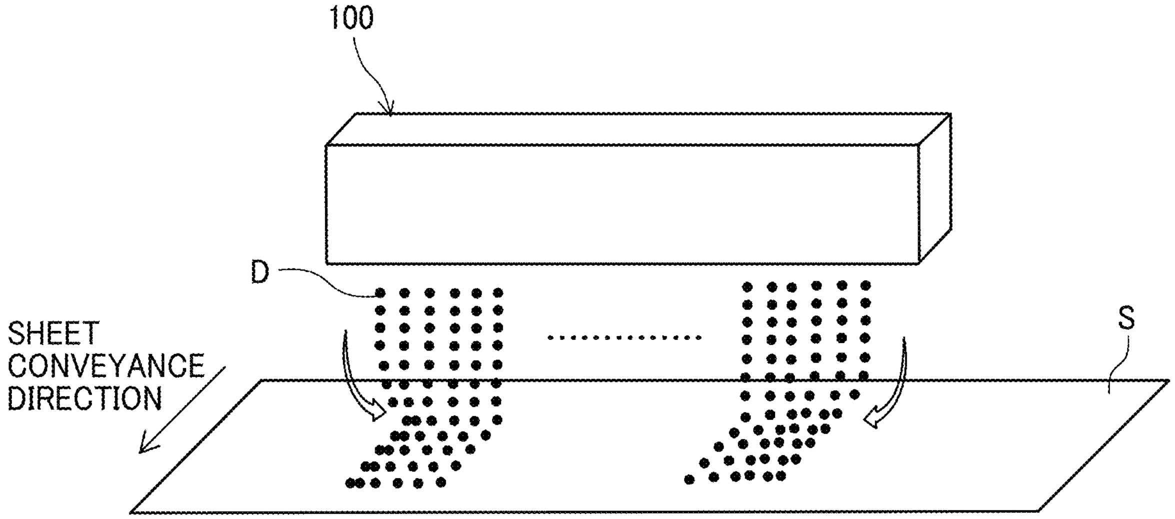

FIG. 26 COMPARATIVE EXAMPLE
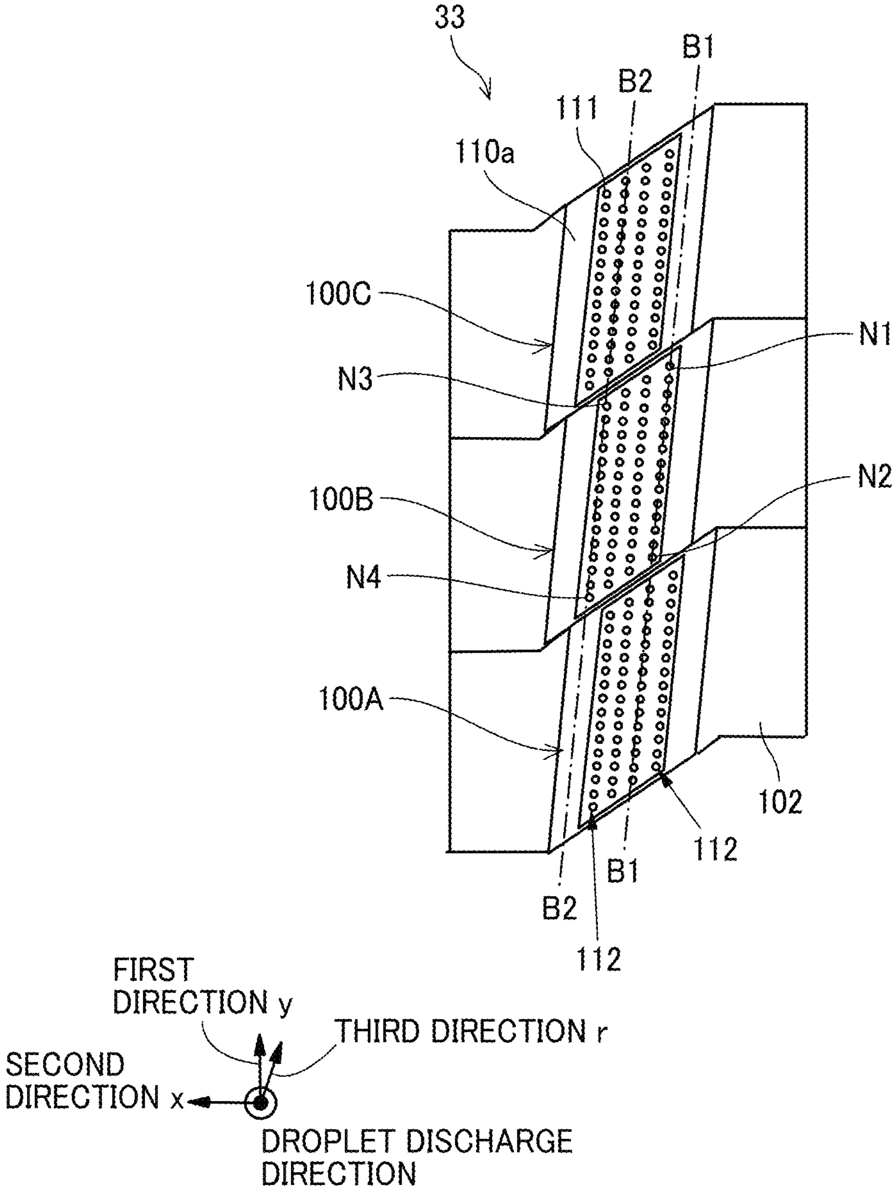

FIG. 27A COMPARATIVE EXAMPLE
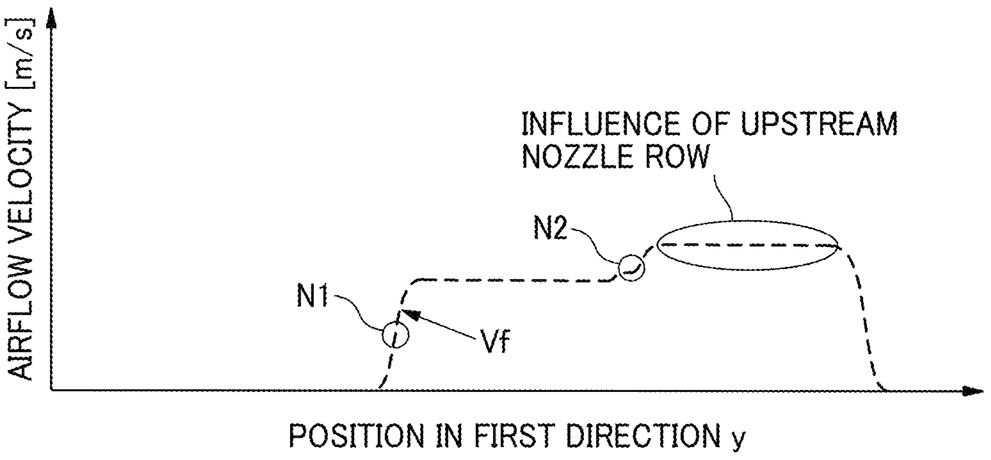
FIG. 27B COMPARATIVE EXAMPLE
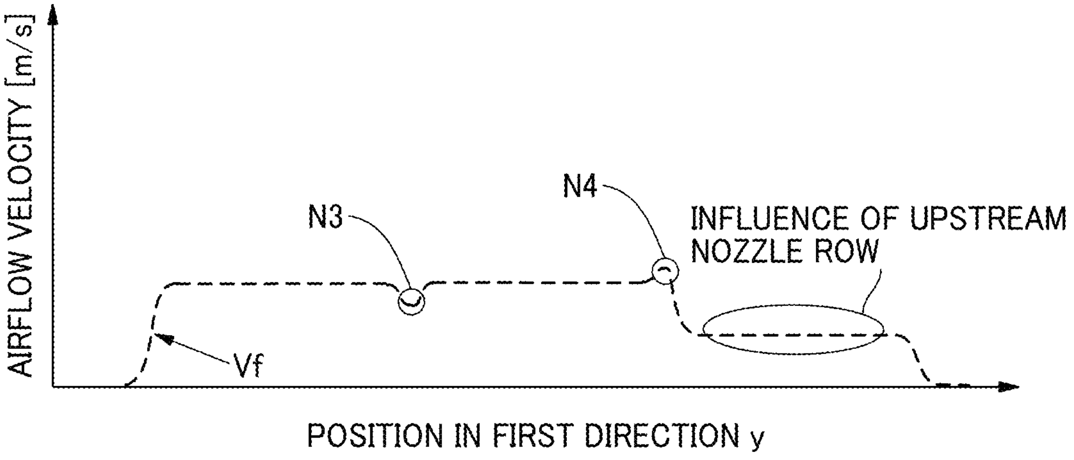

DISCHARGE HEAD, DISCHARGE HEAD UNIT, DISCHARGE APPARATUS, AND PRINTER

CROSS-REFERENCE TO RELATED APPLICATION

This patent application is based on and claims priority pursuant to 35 U.S.C. § 119 (a) to Japanese Patent Application No. 2023-049282, filed on Mar. 27, 2023, in the Japan Patent Office, the entire disclosure of which is hereby incorporated by reference herein.

BACKGROUND

Technical Field

Embodiments of the present disclosure relate to a discharge head, a discharge head unit, a discharge apparatus, and a printer.

Related Art

In the related art, a printer discharges a liquid to print images on an object to which the liquid is applied. For example, the printer includes a discharge head including a nozzle row in which multiple nozzles are arrayed or a head array on which multiple head modules are mounted. The printer moves the discharge head (or the head array) and the object relative to each other to print a desired image on the object.

SUMMARY

Embodiments of the present disclosure describe an improved discharge head that includes multiple nozzles and a recess. The multiple nozzles are arrayed in a first direction on a nozzle face of the discharge head to define a nozzle row. A liquid is dischargeable from the multiple nozzles in a discharge direction intersecting the first direction. The recess is recessed from the nozzle face in a second direction opposite to the discharge direction. The recess is disposed at one side of the nozzle row in a third direction intersecting each of the first direction and the second direction. The recess has a wall face extending in the first direction and the second direction. The wall face is disposed between the nozzle row and a side face of the discharge head in the third direction. The discharge head has an inner region in which the multiple nozzles are arrayed and an outer region outside the inner region in the first direction. The recess covers a boundary region between the inner region and the outer region in the first direction. The wall face has a first height from the nozzle face in the outer region in the second direction and a second height lower than the first height from the nozzle face in the inner region in the second direction.

According to another embodiment of the present disclosure, there is provided a discharge head including a nozzle row and recesses. The multiple nozzles are arrayed in a first direction on a nozzle face of the discharge head to define a nozzle row. A liquid is dischargeable from the multiple nozzles in a discharge direction intersecting the first direction. The recesses are recessed from the nozzle face in a second direction opposite to the discharge direction. The recesses are disposed at one side of the nozzle row in a third direction intersecting each of the first direction and the second direction. The recesses are disposed at both end parts of the discharge head in the first direction. Each of the recesses has a wall face extending in the first direction and the second direction. The wall face is disposed between the nozzle row and a side face of the discharge head in the third direction. The discharge head has an inner region in which the multiple nozzles are arrayed and an outer region outside the inner region in the first direction. Each of the recesses covers a part of the outer region and does not cover the inner region in the first direction.

According to yet another embodiment of the present disclosure, there is provided a discharge head unit including multiple discharge heads arrayed in a first direction and a recess. Each of the multiple discharge heads includes multiple nozzles arrayed in a second direction intersecting the first direction on a nozzle face of each of the multiple discharge heads to define a nozzle row. The recess is recessed from the nozzle face in a third direction intersecting the first direction and the second direction in each of the multiple discharge heads. The recess is disposed at one side of the nozzle row in a fourth direction intersecting each of the first direction, the second direction, and the third direction. The recess has a wall face extending in the second direction and the third direction. The wall face is disposed between the nozzle row and a side face of each of the multiple discharge heads in the fourth direction. Each of the multiple discharge heads has an inner region in which the multiple nozzles are arrayed and an outer region outside the inner region in the first direction. The recess covers at least a part of the outer region.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a schematic front view of a discharge head according to a first comparative example, corresponding to FIG. 2;

FIGS. 6A and 6B are diagrams each illustrating a droplet flying in a jet airflow according to the first comparative example;

FIG. 7 is a graph illustrating the relation between the nozzle position of the discharge head of FIG. 5 and the velocity of the jet airflow generated by droplets discharged from the discharge head of FIG. 5, according to the first comparative example;

FIG. 8 is a schematic perspective view of the discharge head of FIG. 5, according to the first comparative example, illustrating droplets that fly and land on an object.

FIG. 26 is a schematic plan view of a discharge head unit according to a second comparative example as viewed from the nozzle face side thereof;

FIGS. 27A and 27B are graphs each illustrating the velocity of a jet airflow generated by droplets discharged from the discharge head of FIG. 26 at the nozzle position on line B1-B1 and line B2-B2, according to the second comparative example;

Figure 1:
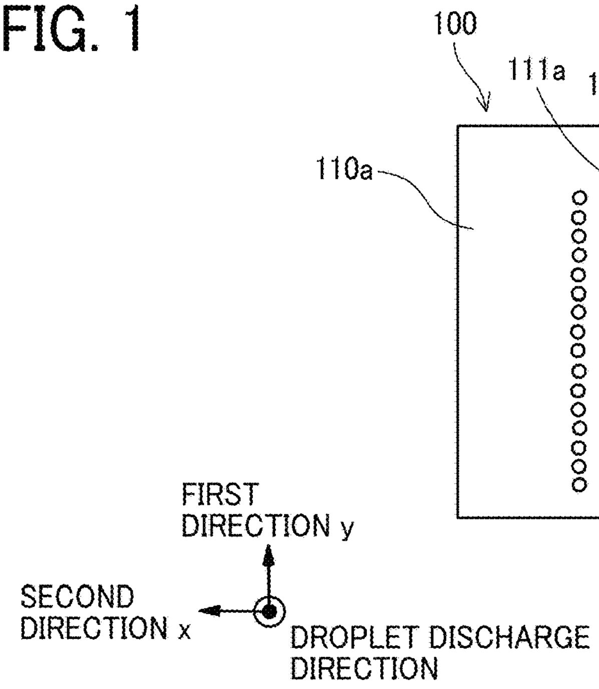
FIG. 1 is a schematic plan view of a discharge head according to a first embodiment of the present disclosure as viewed from the nozzle face side thereof.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
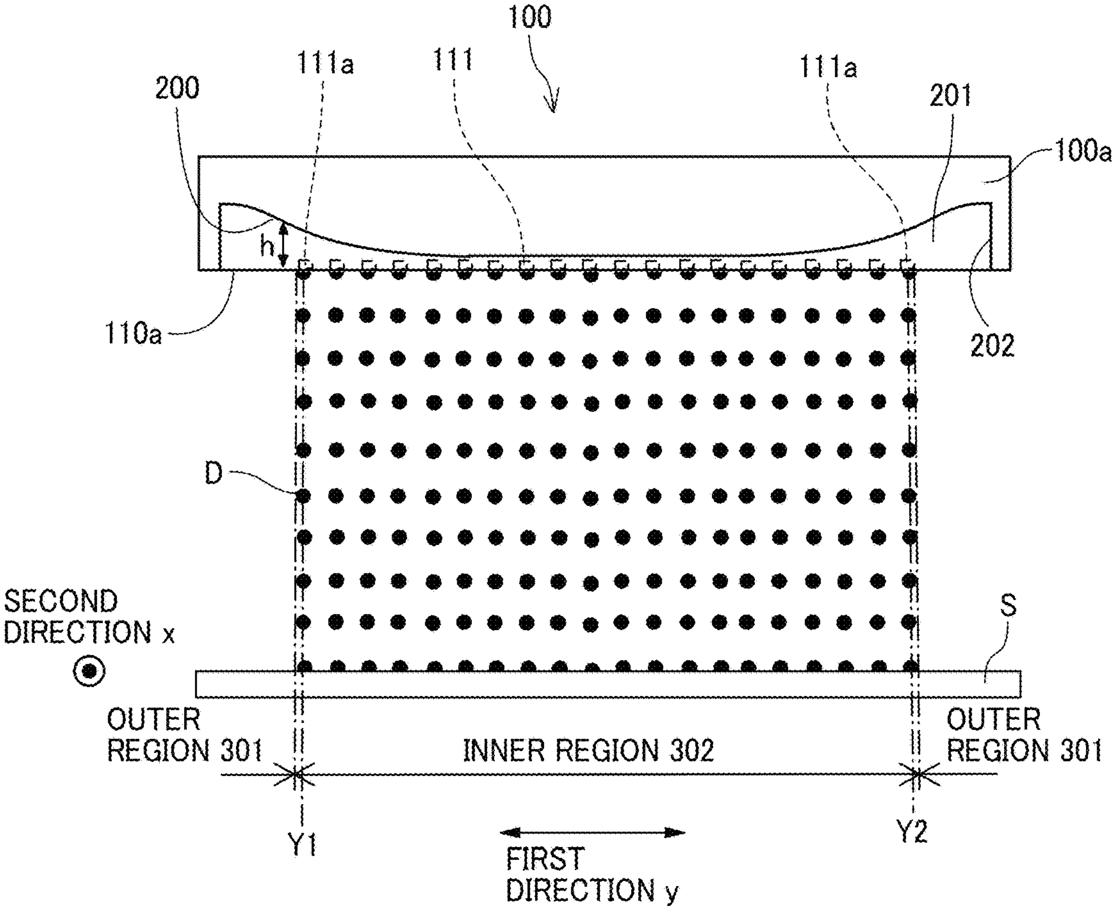
FIG. 2 is a schematic front view of the discharge head of FIG. 1.
Figure 3:
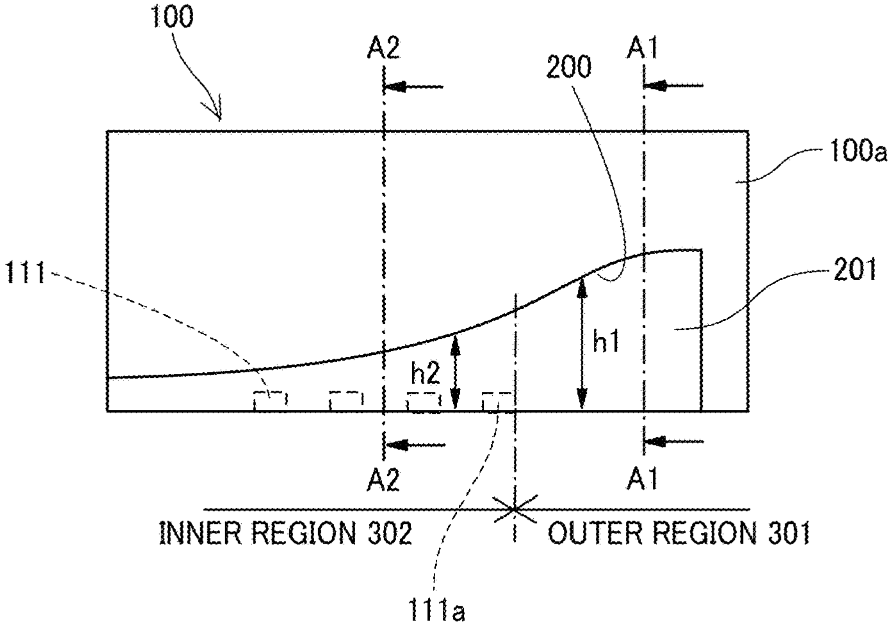
FIG. 3 is a schematic enlarged view of a part of the discharge head of FIG. 2.
Figure 4A:
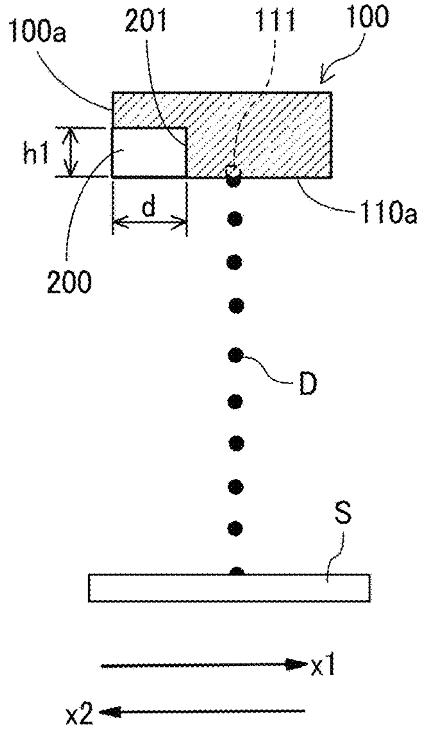
FIGS. 4A and 4B are schematic cross-sectional side views of the part of the discharge head of FIG. 3.
Figure 4B:
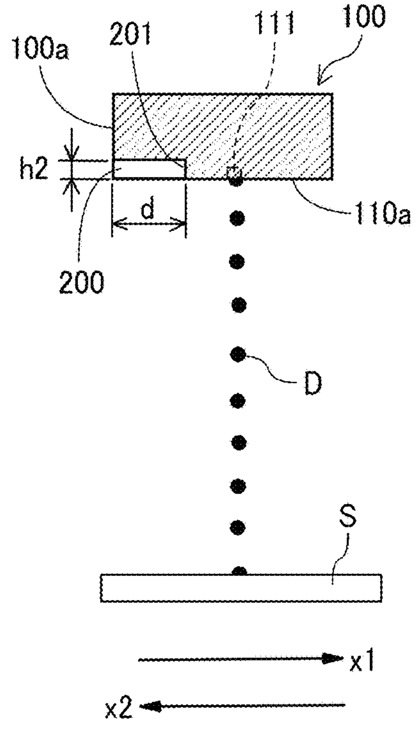

Embodiments of the present disclosure are described below with reference to the accompanying drawings. A discharge head according to a first embodiment of the present disclosure is described below with reference to FIGS. 1 to 4. FIG. 1 is a schematic plan view of the discharge head according to the first embodiment as viewed from the nozzle face side thereof. FIG. 2 is a schematic front view of the discharge head of FIG. 1. FIG. 3 is a schematic enlarged view of a part of the liquid discharge head of FIG. 2. FIGS. 4A and 4B are schematic cross-sectional side views of the part of the discharge head of FIG. 3. FIG. 4A is a schematic cross-sectional view taken along line A1-A1 of FIG. 3. FIG. 4B is a schematic cross-sectional view taken along line A2-A2 of FIG. 3.

A discharge head 100 according to the first embodiment includes one or multiple nozzle rows 112 and a recess 200. Each nozzle row 112 includes multiple nozzles 111 arrayed in a first direction y on a nozzle face 110*a* of the discharge head 100. The discharge head 100 discharges a liquid such as ink from the multiple nozzles 111 in a droplet discharge direction perpendicular to the nozzle face 110*a*. The recess 200 is opened on the nozzle face 110*a* on which the nozzle row 112 is arranged.

In the first direction y, the nozzle 111 at the end of the nozzle row 112 is referred to as an end nozzle 111*a*, a region outside each end nozzle 111*a* is referred to as an outer region 301, and a region including the end nozzle 111*a* and inside each end nozzle 111*a* is referred to as an inner region 302. One end nozzle 111*a* is disposed at a position Y1 in the first direction y, and the other end nozzle 111*a* is disposed at a position Y2 in the first direction y.

The recess 200 is formed in a region wider than the width of the nozzle row 112 in the first direction y, and is continuous from one outer region 301 to the other outer region 301 through the inner region 302. The recess 200 is formed from the outer region 301 to the inner region 302 in the first direction, and has a first wall face 201 facing the upstream side in a second direction x intersecting the first direction y. In the present embodiment, the recess 200 is also opened on a sidewall face 100*a* of the discharge head 100 in the second direction x.

The "upstream side in the second direction x" means the upstream side in the movement direction of a sheet S (i.e., a sheet conveyance direction) when the discharge head 100 and the sheet S move relative to each other. In the present embodiment, the sheet S is an object to which liquid is applied.

As illustrated in FIGS. 4A and 4B, when the sheet S (i.e., the object to which liquid is applied) moves in an x1 direction of the second direction x relative to the fixed discharge head 100, the recess 200 is positioned on the upstream side of the nozzle row 112, and the first wall face 201 is positioned on the upstream side in the x1 direction relative to the nozzle row 112 and faces the upstream side in the x1 direction (sheet conveyance direction).

On the other hand, when the discharge head 100 moves in an x2 direction of the second direction x relative to the sheet S, the first wall face 201 is positioned on the downstream side in the x2 direction relative to the nozzle row 112 and faces the downstream side in the x2 direction. At this time, in the relative movement direction of the discharge head 100 and the sheet S, the sheet S seems to be conveyed in the x1 direction. Accordingly, the recess 200 is positioned on the upstream side of the nozzle row 112 and the first wall face 201 is positioned on the upstream side of the nozzle row 112 in the relative movement direction of the sheet S relative to the discharge head 100. The first wall face 201 faces the upstream side in the relative movement direction of the sheet S relative to the discharge head 100.

As described above, the discharge head 100 has the first wall face 201 facing the upstream side in the second direction x. As a result, the airflow generated by the movement of the sheet S hits the first wall face 201 of the recess 200 and is directed downward, and thus a descending airflow is generated.

In the recess 200, a height h1 of the first wall face 201 from the nozzle face 110*a* in the outer region 301 is higher than a height h2 of the first wall face 201 from the nozzle face 110*a* in the inner region 302 in the first direction y. The height h1 and the height h2 may be collectively referred to as a height h in the following description.

In the present embodiment, as illustrated in FIG. 2, the height h of the first wall face 201 of the recess 200 from the nozzle face 110*a* gradually changes (decreases) from the outer region 301 toward the inner region 302. In addition, the height h of the first wall face 201 of the recess 200 from the nozzle face 110*a* gradually decreases from both the end nozzles 111*a* toward the central portion of the recess 200 in the inner region 302.

The recess 200 has a second wall face 202 extending in the second direction x. A length d of the second wall face 202 in the second direction x is preferably ½ or more of the height h1 of the first wall face 201 in the outer region 301. The length d of the second wall face 202 in the second direction x in the above-described range allows the sufficient amount of the airflow to enter the recess 200 from the upstream side in the second direction x, and thus the airflow descending from the discharge head 100 toward the sheet S can be sufficiently obtained.

The bending of droplets discharged from end nozzles according to a first comparative example, which is compared with effects of the present embodiment, is described below with reference to FIGS. 5 to 8. FIG. 5 is a schematic front view of a discharge head according to the first comparative example, corresponding to FIG. 2. FIGS. 6A and 6B are diagrams each illustrating a droplet flying in a jet airflow according to the first comparative example. FIG. 7 is a graph illustrating the relation between the nozzle position of the discharge head of FIG. 5 and the velocity of the jet airflow generated by the droplets discharged from the discharge head of FIG. 5, according to the first comparative example. FIG. 8 is a schematic perspective view of the discharge head of FIG. 5, according to the first comparative example, illustrating droplets that fly and land on an object.

As illustrated in FIG. 5, a discharge head 100 according to the first comparative example does not have the recess 200 according to the present embodiment. When droplets D of liquid are discharged from multiple nozzles 111 of a nozzle row 112 according to the first comparative example (all the nozzles 111 in FIG. 5 for convenience of description), a downward airflow (jet airflow) is generated by the discharged (jetted) droplets D.

When Vf represents the velocity of the jet airflow and Vd represents the downward component of the velocity of the droplet D, the droplet D continuously receives the resistance of the airflow (relative airflow) having the relative velocity (Vd−Vf) until the droplet D lands on the sheet S (i.e., the object to which the discharged droplet D is applied).

FIGS. 6A and 6B are diagrams each illustrating the droplet D flying downward in the downward jet airflow as viewed not in Euler coordinates but in Lagrange coordinates. Streamlines 303 indicate streamlines of the relative airflow as viewed in Lagrange coordinates. The density of the streamlines 303 indicates the velocity of the relative airflow, and the direction of the streamlines 303 indicates the direction of the relative airflow.

At this time, as illustrated in FIG. 6A, the pressure is positive below the droplet D (the object side), the pressure is negative beside the droplet D, and the pressure is close to the atmospheric pressure above the droplet D (the nozzle side) due to turbulence. The airflow collides with the lower side of the droplet D relatively and bends sharply along the streamlines 303. Accordingly, a strong positive pressure is applied to the droplet D according to the streamline curvature theorem, and thus the droplet D flies while gradually decelerating.

With the configuration according to the first comparative example, the jet airflow has a velocity distribution in the first direction y along the nozzle row 112 (i.e., a nozzle row direction). As illustrated in FIG. 7, the jet airflow becomes weaker and the velocity Vf of the jet airflow becomes smaller toward the end of the nozzle row 112. Accordingly, the droplet D discharged from the nozzle 111 closer to the end nozzle 111*a* of the nozzle row 112 receives a stronger resistance. In other words, the relative speed (Vd-Vf) increases outward in the nozzle row 112.

As a result, as illustrated in FIG. 6B, the density of the streamlines 303 of the relative airflow received by the outward surface, which faces toward the end nozzle 111*a* of the nozzle row 112, of the droplets D increases outward in the nozzle row direction. In other words, the velocity of the relative airflow is faster on the outward surface than on the inward surface of the droplet D in the first direction y, and the velocity of the relative airflow on the outward surface of the droplet D is faster at the position closer to the end nozzle 111*a* in the nozzle row direction. At this time, according to the law of streamline density, both the positive pressure on the outward lower surface of the droplet D and the negative pressure on the outward side surface of the droplet D are larger than those on the inward lower surface and the inward side surface of the droplet D in the nozzle row direction.

In consideration of the resultant force of the negative pressure and the positive pressure, the positive pressure on the outward lower surface of the droplet D in the nozzle row direction largely affects the droplet D. Accordingly, the resultant force of the pressure applied onto the entire surface of the droplet D has an inward component in the nozzle row direction. As a result, as illustrated in FIG. 8, the droplet D discharged from the nozzle 111 close to the end nozzle 111*a* in the nozzle row direction gradually bends inward (toward the center portion of the nozzle row 112).

For example, 5 picoliters (pl) of the droplet D were discharged onto the sheet S across 4 millimeters (mm) of gap between the nozzle face 110*a* and the sheet S (drive frequency 40 kHz) to print a small-dot solid image. As a result, a white streak (i.e., abnormal image) was observed when the duty is 50% or more. This is because the jet airflow increases with an increase in the duty. Further, the larger gap makes the white streak due to the bending of the droplet D more noticeable.

Figure 9:
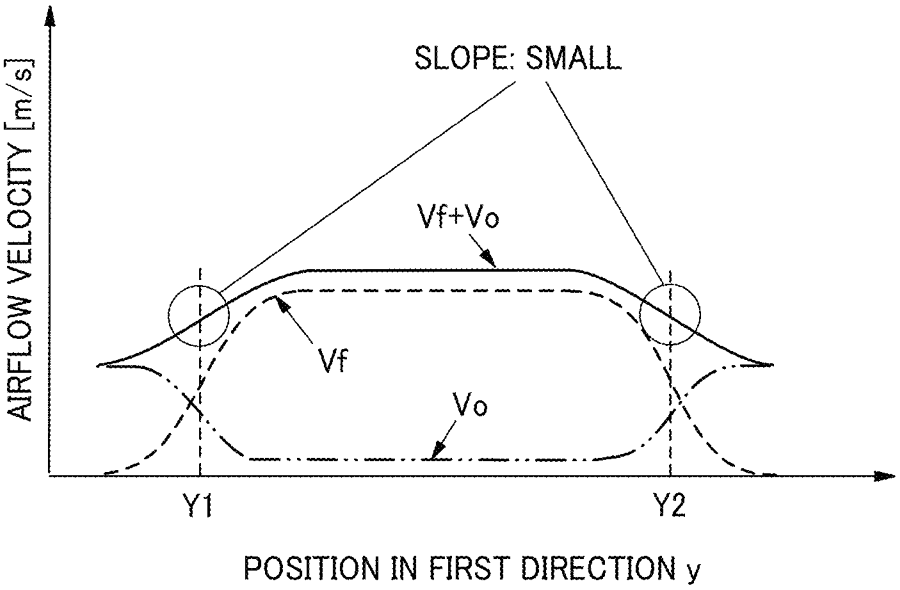
FIG. 9 is a graph illustrating the distributions of a jet airflow, a recess airflow, and a combined airflow thereof in a nozzle row direction, according to the first embodiment.
Figure 10:
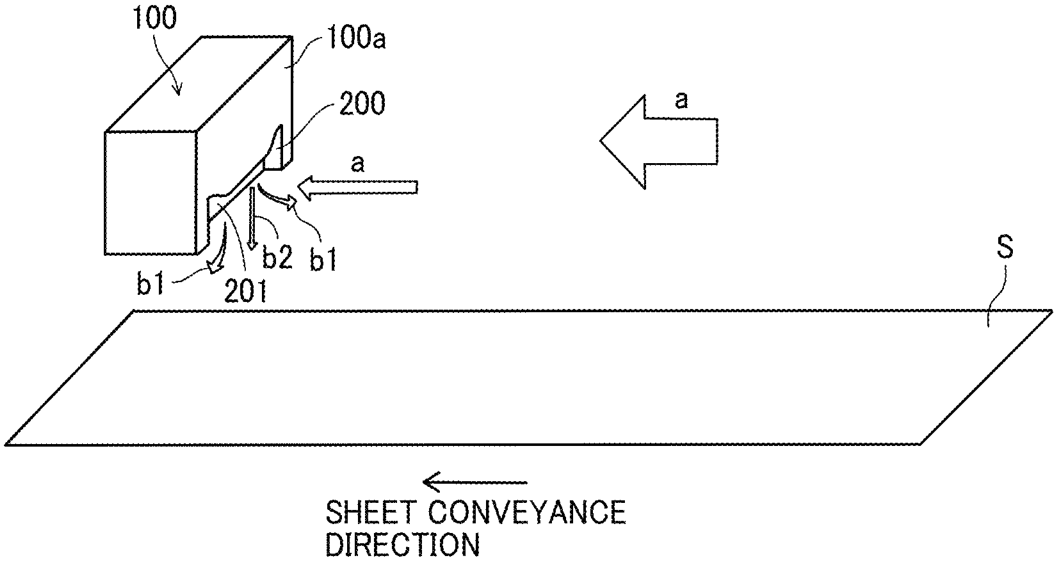
FIG. 10 is a schematic perspective view of the discharge head of FIG. 1, according to the first embodiment, illustrating a downward airflow generated by droplets discharged from the discharge head of FIG. 1.
Figure 11:
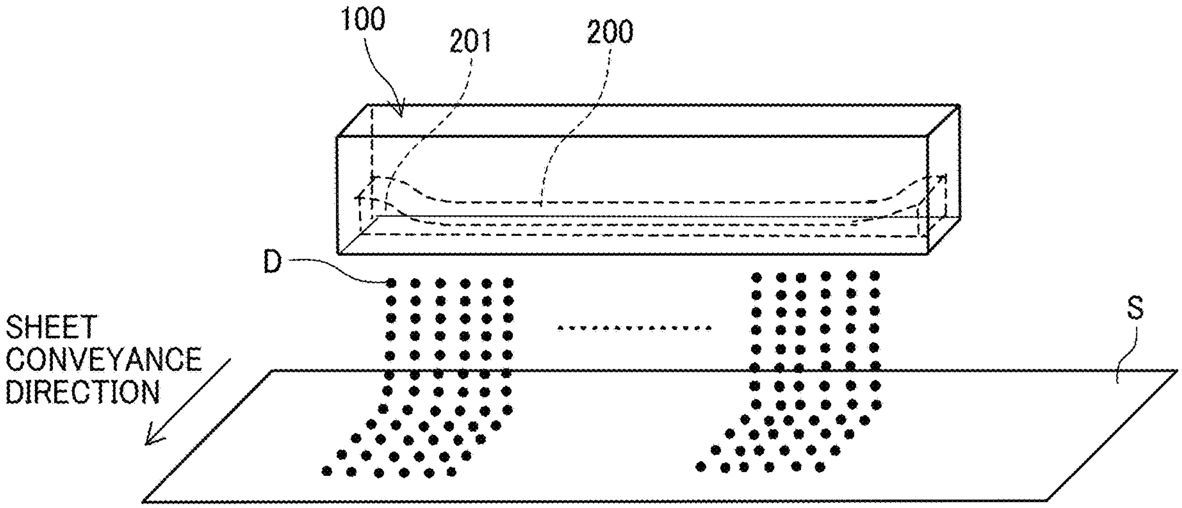
FIG. 11 is a schematic perspective view of the discharge head of FIG. 1, according to the first embodiment, illustrating droplets that fly and land on an object.

Effects of the recess according to the first embodiment are described below with reference to FIGS. 9 to 11. FIG. 9 is a graph illustrating the distributions of the jet airflow, a recess airflow, and a combined airflow thereof in the nozzle row direction, according to the first embodiment. FIG. 10 is a schematic perspective view of the discharge head according to the first embodiment, illustrating the downward airflow generated by droplets discharged from the discharge head. FIG. 11 is a schematic perspective view of the discharge head according to the first embodiment, illustrating droplets that fly and land on the sheet S.

As illustrated in FIG. 10, when the discharge head 100 is fixed and the sheet S moves in the sheet conveyance direction (x1 direction), an airflow a generated by the movement of the sheet S enters the recess 200 of the discharge head 100. The airflow a that has entered the recess 200 hits the first wall face 201 and exits downward. Accordingly, a downward airflow is generated, which is referred to as a "recess airflow b (e.g., recess airflows b1 and b2)."

At this time, the flow rate of the airflow colliding with the first wall face 201 is proportional to the height of the first wall face 201. Accordingly, the recess airflow b1 in the outer region 301 where the height h of the first wall face 201 is high is stronger than the recess airflow b2 in the inner region 302.

As a result, the droplet D discharged from the nozzle 111 flies in the combined airflow of the jet airflow and the recess airflow b, and the droplet D receives the resistance of the airflow having the relative velocity (Vd−(Vf+Vo)). Here, Vf represents the velocity of the jet airflow, Vd represents the downward component of the velocity of the droplet D, and Vo represents the velocity of the recess airflow b.

At this time, as illustrated in FIG. 9, the velocity Vo of the recess airflow b increases outward, and the velocity Vf of the jet airflow decreases outward in the first direction y. Accordingly, the slope of the velocity of the combined airflow (Vf+Vo) is smaller than the slope of the velocity Vf of the jet airflow without the recess airflow b.

Accordingly, the difference in the resistance of the relative airflow between on the outward surface and on the inward surface of the droplet D, which is discharged from the end nozzle 111*a* of the nozzle row 112, can be reduced by the recess airflow b. As a result, as illustrated in FIG. 11, the droplet D discharged from the end nozzle 111*a* of the nozzle row 112 is less likely to bend inward due to the difference in the strength of the relative airflow between on the outward surface and on the inward surface of the droplet D.

A specific example of the height of the first wall face 201 is described below. The first wall face 201 having the height h1 of 4 mm or more in the outer region 301 is sufficiently effective.

The velocity Vf of the jet airflow is about 0.4 m/s under conditions that the volume of the droplet D is 2 pl, the interval between the nozzles 111 is 75 dots per inch (dpi), and the drive frequency is 36 kHz. The velocity Vf increases with an increase in the volume of the droplet D, with a decrease in the interval between the nozzles 111, and with an increase in the drive frequency from these conditions.

The velocity Vo of the recess airflow b is about 0.2 m/s at the position downstream from the first wall face 201 by 2 mm under conditions that the gap between the nozzle face 110*a* and the sheet S is 3 mm, the height of the first wall face 201 is 2 mm, and the sheet conveyance speed is 1.693 m/s, which corresponds to 8 rows, 75×8=600 dpi, and the drive frequency 40 kHz. The velocity Vo of the recess airflow b decreases in a decrease in the sheet conveyance speed from these conditions.

The first wall face 201 having a height of about 4 mm and disposed away from the nozzle row 112 by about 2 mm can make the velocity Vo of the recess airflow b equivalent to the velocity Vf of the jet airflow. Accordingly, the first wall face 201 is sufficiently effective in canceling the distribution of the jet airflow.

In the present embodiment, since the recess 200 is opened also on the sidewall face 100*a* of the discharge head 100 in the second direction x, the airflow generated by the sheet S that moves relative to the discharge head 100 is likely to collide with the first wall face 201 of the recess 200.

Figure 12:
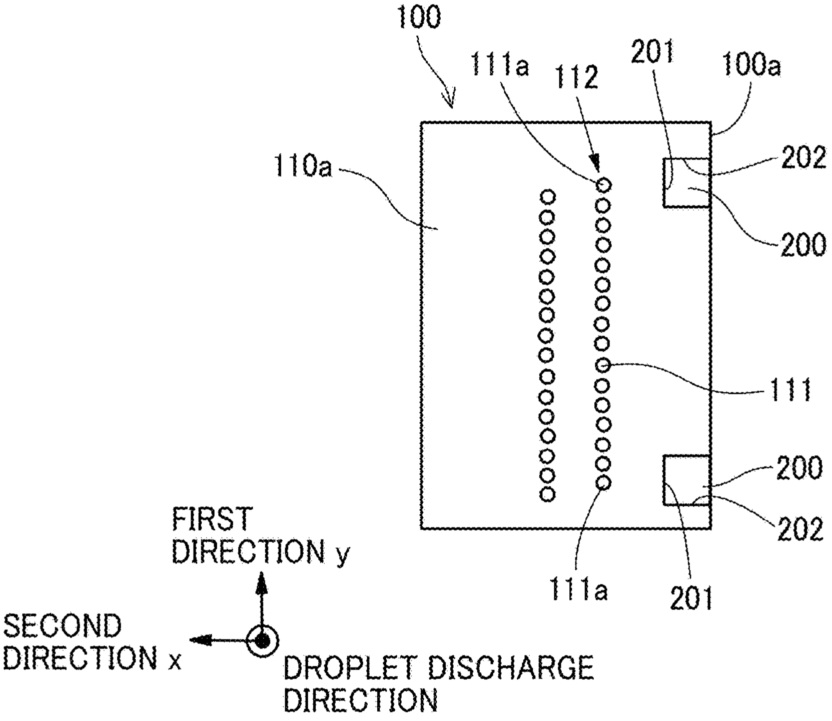
FIG. 12 is a schematic plan view of a discharge head according to a second embodiment of the present disclosure as viewed from the nozzle face side thereof.
Figure 13:
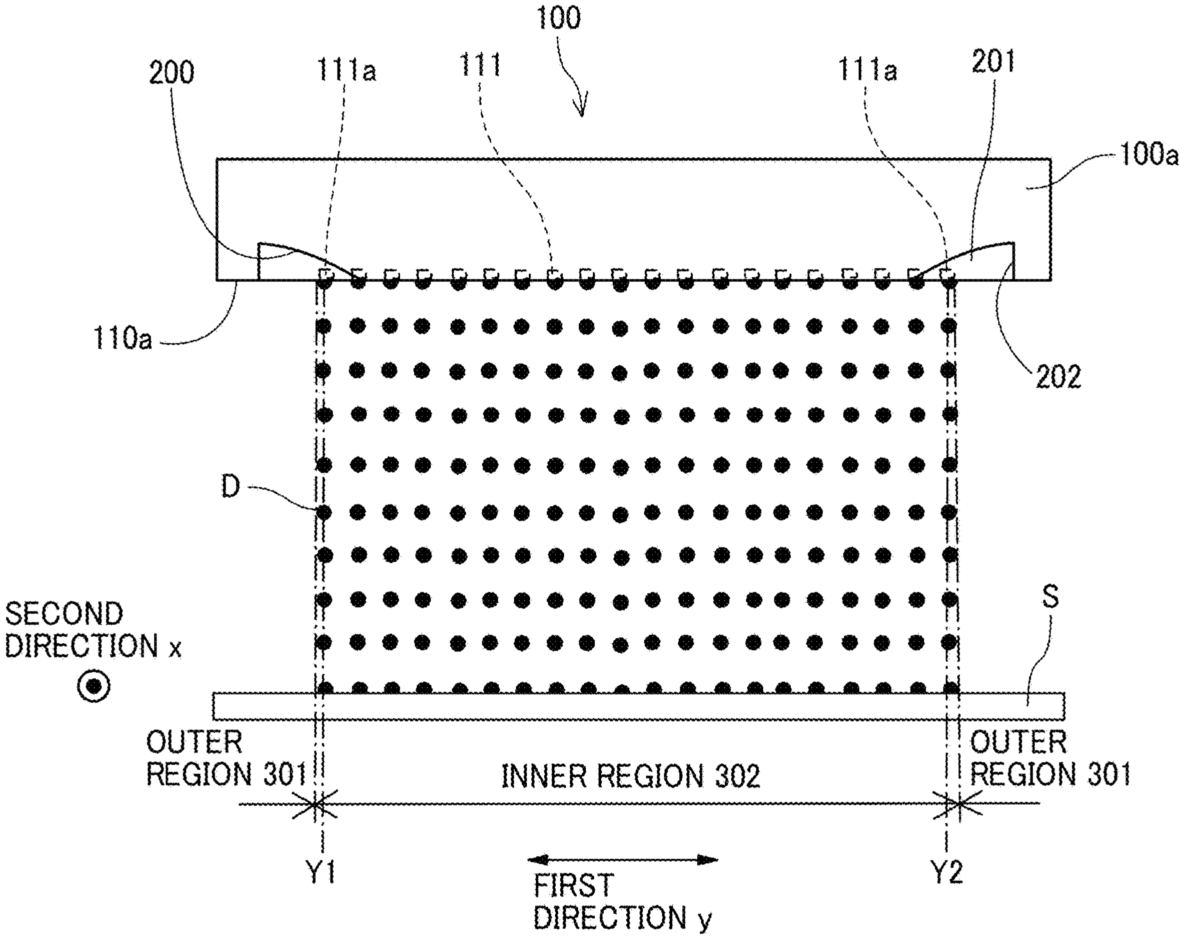
FIG. 13 is a schematic front view of the discharge head of FIG. 12.

A discharge head according to a second embodiment of the present disclosure is described below with reference to FIGS. 12 and 13. FIG. 12 is a schematic plan view of the discharge head according to the second embodiment as viewed from the nozzle face side thereof. FIG. 13 is a schematic front view of the discharge head of FIG. 12.

In a discharge head 100 according to the second embodiment, two separated recesses 200 are provided. Each of the two separated recesses 200 overlaps with the outer region 301 and the inner region 302 at each end of the discharge head 100 in the first direction y. The end nozzle 111*a* is interposed between the outer region 301 and the inner region 302. In other words, in the present embodiment, the height h of the recess 200 is "0" in the center portion of the inner region 302, which is different from the first embodiment. As described above, each of the two separated recesses 200 is disposed in a range from the outer region 301 to the inner region 302 including the end nozzle 111*a*. In the present embodiment, the height h of the first wall face 201 of the recess 200 from the nozzle face 110*a* also gradually decreases from the outer region 301 toward the inner region 302.

Figure 14:
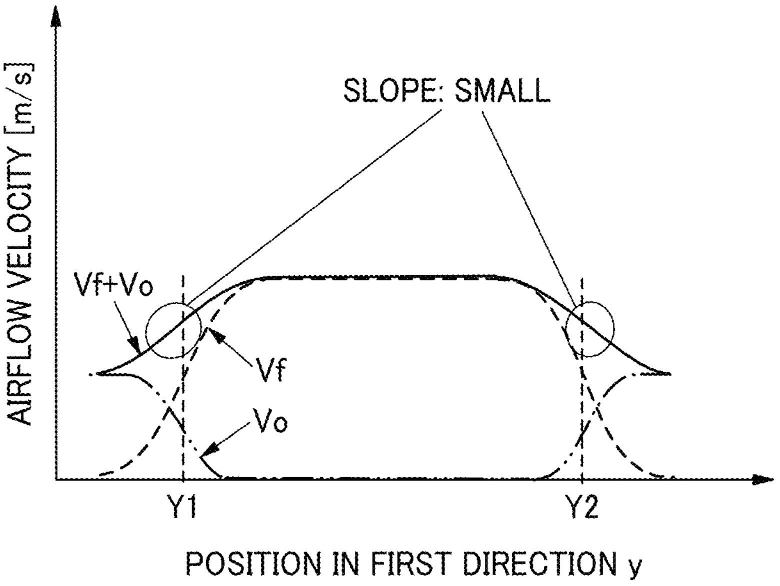
FIG. 14 is a graph illustrating the distributions of a jet airflow, a recess airflow, and a combined airflow thereof in the nozzle row direction, according to the second embodiment.

Effects of the recess 200 according to the second embodiment are described below with reference to FIG. 14. FIG. 14 is a graph illustrating the distributions of the jet airflow, the recess airflow, and the combined airflow thereof in the nozzle row direction, according to the second embodiment.

In the present embodiment, as in the first embodiment, when the discharge head 100 is fixed and the sheet S moves in the sheet conveyance direction (x1 direction), the airflow generated by the movement of the sheet S enters the recess 200 of the discharge head 100, and the recess airflow is generated.

At this time, in the first direction y, as illustrated in FIG. 14, the velocity Vo of the recess airflow is higher in the outer region 301 than in the inner region 302, and the velocity Vf of the jet airflow is lower in the outer region 301 than in the inner region 302. Accordingly, the slope of the velocity of the combined airflow (Vf+Vo) is smaller than the slope of the velocity Vf of the jet airflow without the recess airflow.

Accordingly, the difference in the resistance of the relative airflow between on the outward surface and on the inward surface of the droplet D, which is discharged from the end nozzle 111*a* of the nozzle row 112, can be reduced by the recess airflow. As a result, the droplet D can be prevented from bending.

Figure 15:
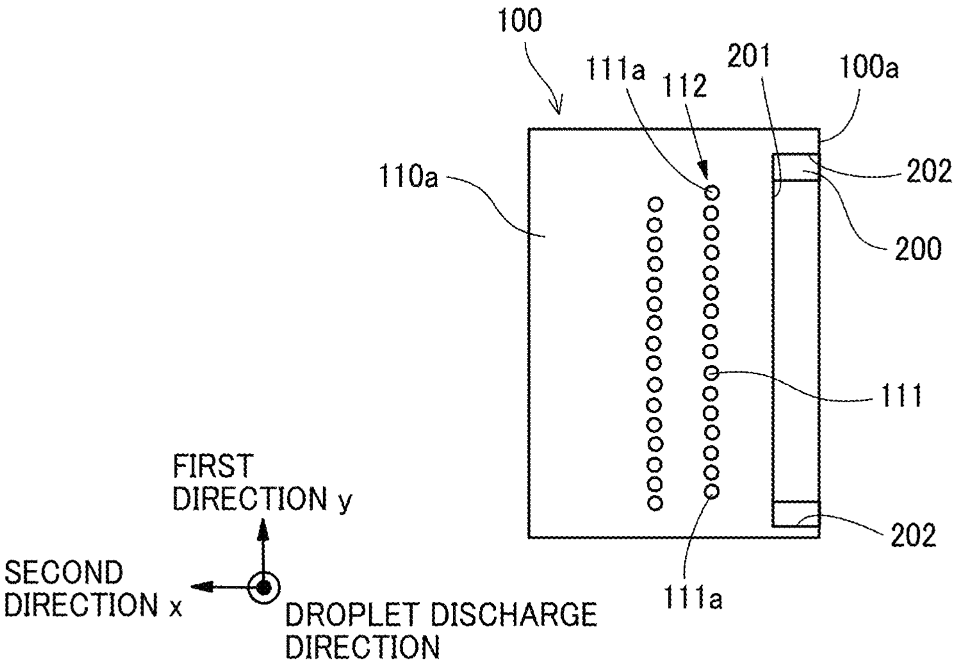
FIG. 15 is a schematic plan view of a discharge head according to a third embodiment of the present disclosure as viewed from the nozzle face side thereof.
Figure 16:
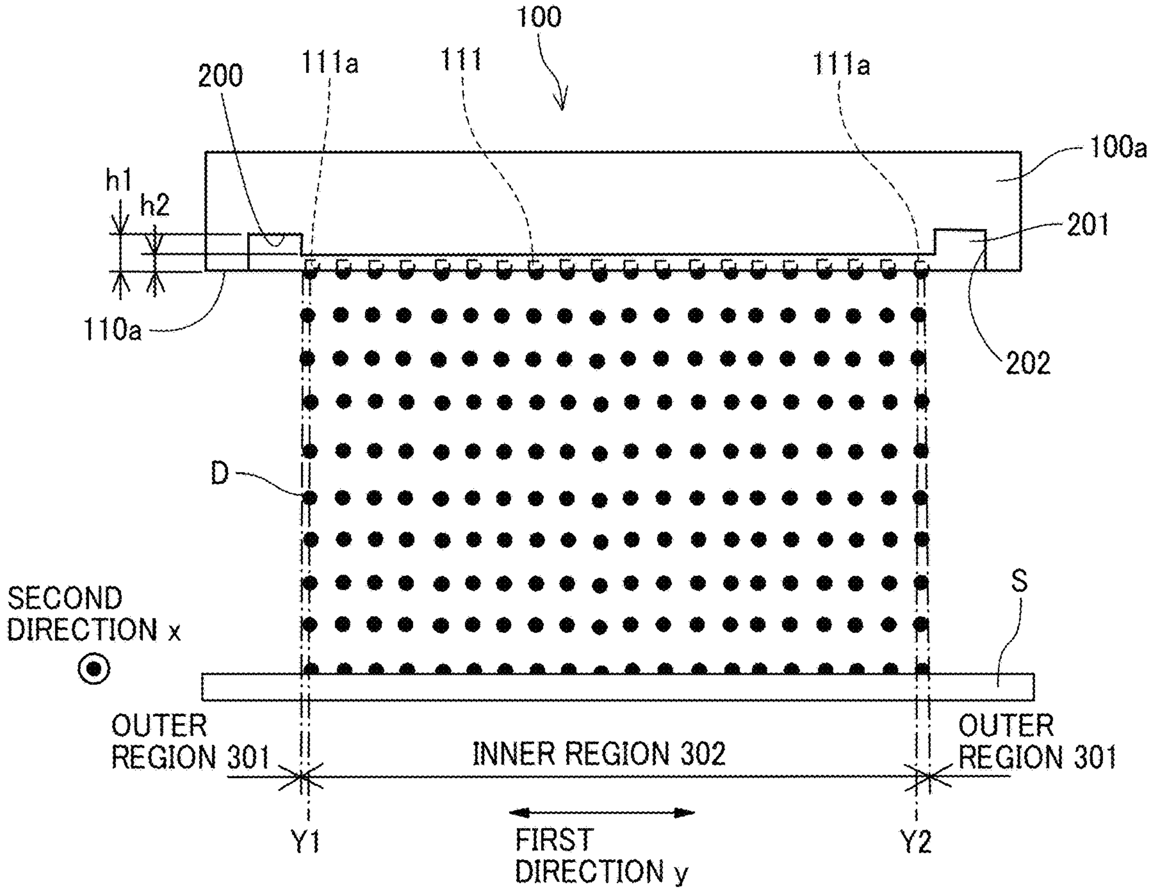
FIG. 16 is a schematic front view of the discharge head of FIG. 15.

A discharge head according to a third embodiment of the present disclosure is described below with reference to FIGS. 15 and 16. FIG. 15 is a schematic plan view of the discharge head according to the third embodiment as viewed from the nozzle face side thereof. FIG. 16 is a schematic front view of the discharge head of FIG. 15.

In a discharge head 100 according to the third embodiment, a recess 200 is disposed from one outer region 301 to the other outer region 301 through the inner region 302 in the first direction y of the discharge head 100. The end nozzle 111*a* is interposed between each outer region 301 and the inner region 302. In addition, the height h of the first wall face 201 of the recess 200 changes stepwise between the outer region 301 and the inner region 302 of the end nozzle 111*a*. The height h1 in the outer region 301 is higher than the height h2 in the inner region 302.

Figure 17:
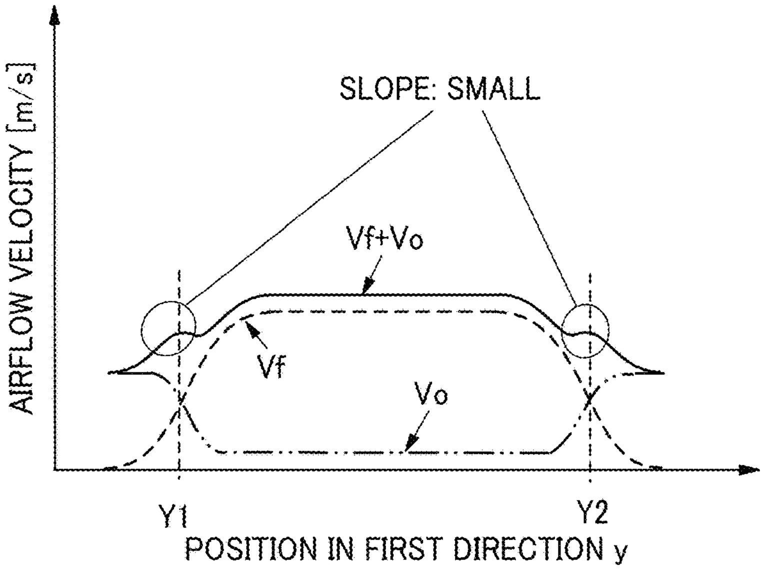
FIG. 17 is a graph illustrating the distributions of a jet airflow, a recess airflow, and a combined airflow thereof in the nozzle row direction, according to the third embodiment.

Effects of the recess 200 according to the third embodiment are described below with reference to FIG. 17. FIG. 17 is a graph illustrating the distributions of the jet airflow, the recess airflow, and the combined airflow thereof in the nozzle row direction, according to the third embodiment.

In the present embodiment, as in the first embodiment, when the discharge head 100 is fixed and the sheet S moves in the sheet conveyance direction (x1 direction), the airflow generated by the movement of the sheet S enters the recess 200 of the discharge head 100, and the recess airflow is generated.

At this time, as illustrated in FIG. 17, the velocity Vo of the recess airflow increases outward, and the velocity Vf of the jet airflow decreases outward in the first direction y. Accordingly, the slope of the velocity of the combined airflow (Vf+Vo) is smaller than the slope of the velocity Vf of the jet airflow without the recess airflow. In the present embodiment, the height h of the first wall face 201 of the recess 200 changes stepwise, and thus the velocity (Vf+Vo) of the combined airflow decreases once and then increases near the end nozzle 111*a* in the first direction y.

Accordingly, the difference in the resistance of the relative airflow between on the outward surface and on the inward surface of the droplet D, which is discharged from the end nozzle 111*a* of the nozzle row 112, can be reduced by the recess airflow. As a result, the droplet D can be prevented from bending. In the present embodiment, since the shape of the recess 200 is a simple shape formed by flat faces, a material which is difficult to be processed into a curved face can be used for forming the recess 200.

Figure 18:
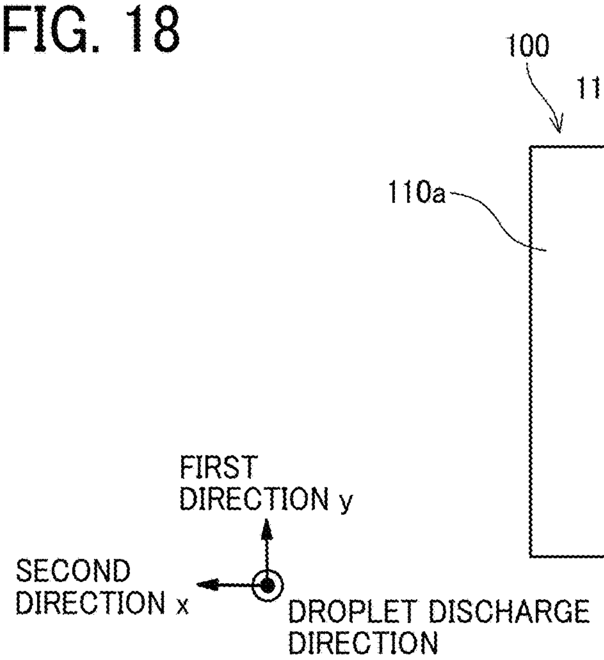
FIG. 18 is a schematic plan view of a discharge head according to a fourth embodiment of the present disclosure as viewed from the nozzle face side thereof.
Figure 19:
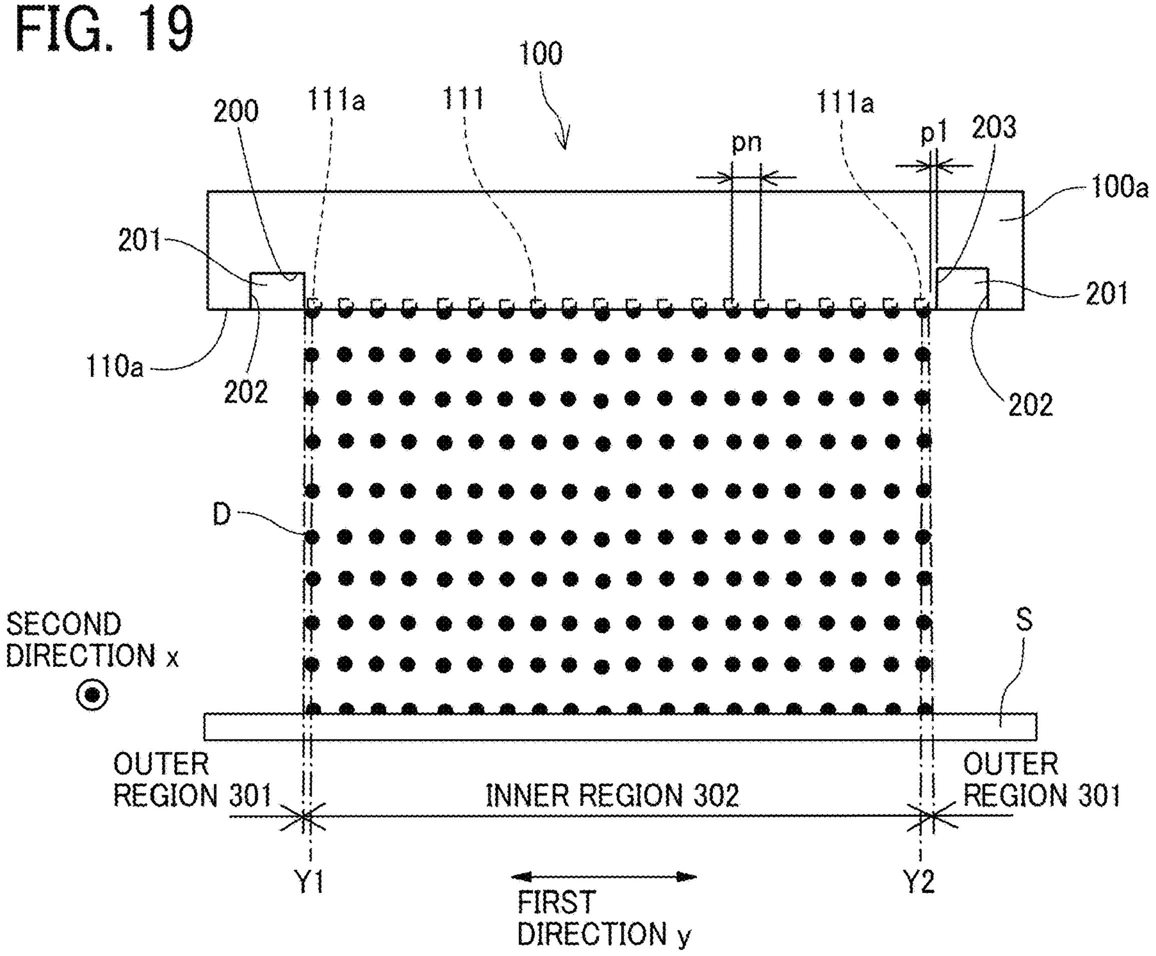
FIG. 19 is a schematic front view of the discharge head of FIG. 18.

A discharge head according to a fourth embodiment of the present disclosure is described below with reference to FIGS. 18 and 19. FIG. 18 is a schematic plan view of the discharge head according to the fourth embodiment as viewed from the nozzle face side thereof. FIG. 19 is a schematic front view of the discharge head of FIG. 18.

In a discharge head 100 according to the fourth embodiment, two separated recesses 200 are disposed in the outer regions 301 outboard of both the end nozzles 111*a* in the first direction y of the discharge head 100, respectively. The two separated recesses 200 do not overlap with the inner region 302.

The height h of the first wall face 201 of the recess 200 is constant. A distance p1 between a second wall face 203 of the recess 200 on the nozzle row 112 side and the end nozzle 111*a* is equal to or less than an array pitch pn of the nozzles 111 (i.e., the interval between the nozzles 111).

Figure 20:
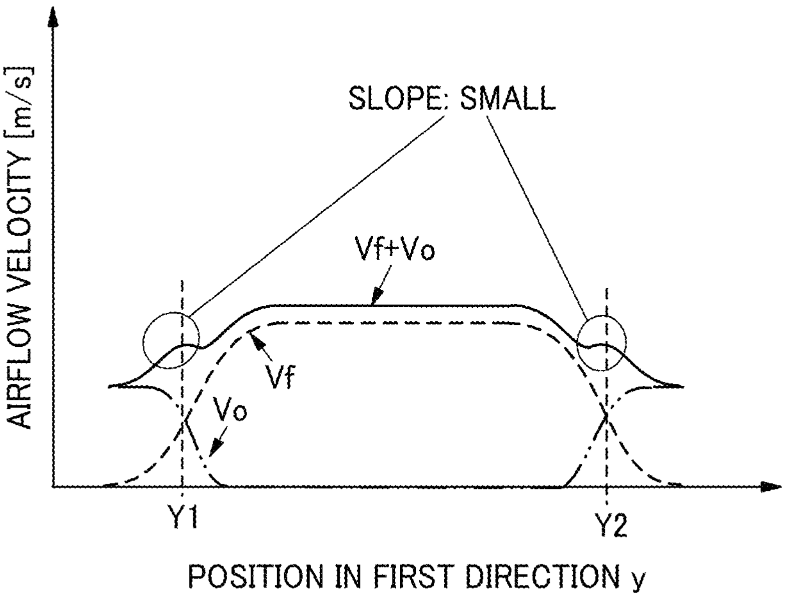
FIG. 20 is a graph illustrating the distributions of a jet airflow, a recess airflow, and a combined airflow thereof in the nozzle row direction, according to the fourth embodiment.

Effects of the recess 200 according to the fourth embodiment are described below with reference to FIG. 20. FIG. 20 is a graph illustrating the distributions of the jet airflow, the recess airflow, and the combined airflow thereof in the nozzle row direction, according to the fourth embodiment.

In the present embodiment, as in the first embodiment, when the discharge head 100 is fixed and the sheet S moves in the sheet conveyance direction (x1 direction), the airflow generated by the movement of the sheet S enters the recess 200 of the discharge head 100, and the recess airflow is generated.

At this time, as illustrated in FIG. 20, the velocity Vo of the recess airflow increases outward, and the velocity Vf of the jet airflow decreases outward in the first direction y. Accordingly, the slope of the velocity of the combined airflow (Vf+Vo) is smaller than the slope of the velocity Vf of the jet airflow without the recess airflow. In the present embodiment, the recess 200 is disposed in the outer region 301 and does not overlap with the inner region 302, and thus the velocity (Vf+Vo) of the combined airflow decreases once and then increases near the end nozzle 111*a* in the first direction y.

In the present embodiment, the distance p1 between the second wall face 203 of the recess 200 on the nozzle row 112 side and the end nozzle 111*a* is equal to or less than the array pitch pn of the nozzles 111 (i.e., the interval between the nozzles 111). Accordingly, a portion in which the combined airflow is low in the vicinity of the positions Y1 and Y2 of the end nozzles 111*a* in the first direction in FIG. 20 can be sufficiently reduced.

Accordingly, the difference in the resistance of the relative airflow between on the outward surface and on the inward surface of the droplet D, which is discharged from the end nozzle 111*a* of the nozzle row 112, can be reduced by the recess airflow. As a result, the droplet D can be prevented from bending.

Figure 21:
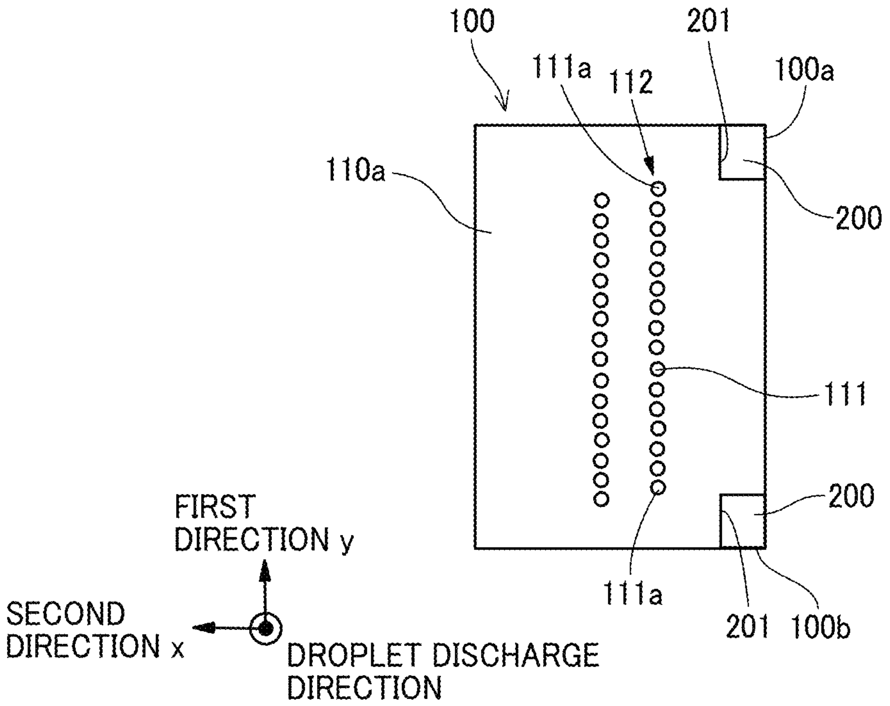
FIG. 21 is a schematic plan view of a discharge head according to a fifth embodiment of the present disclosure as viewed from the nozzle face side thereof.
Figure 22:
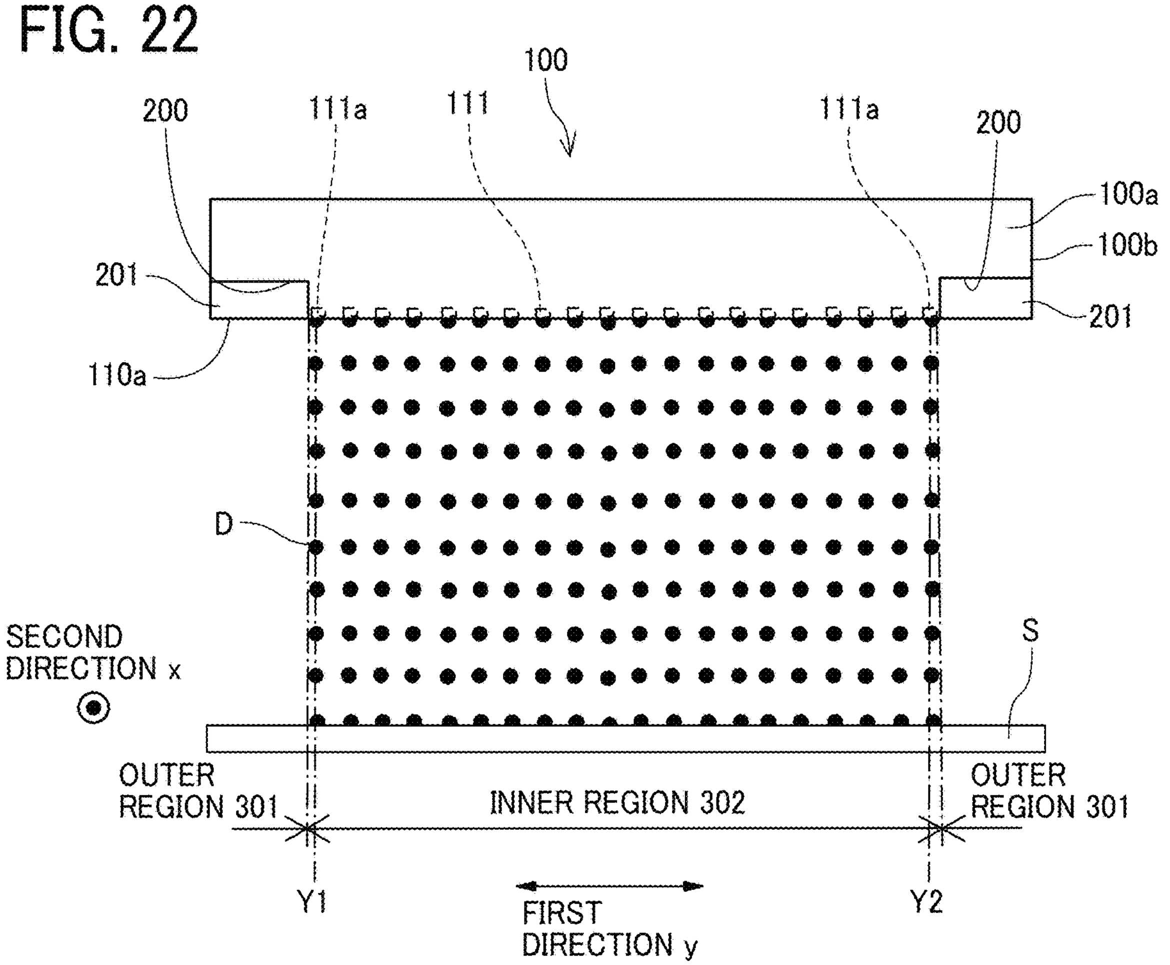
FIG. 22 is a schematic front view of the discharge head of FIG. 21.

A discharge head according to a fifth embodiment of the present disclosure is described below with reference to FIGS. 21 and 22. FIG. 21 is a schematic plan view of the discharge head according to the fifth embodiment as viewed from the nozzle face side thereof. FIG. 22 is a schematic front view of the discharge head of FIG. 21.

In a discharge head 100 according to the fifth embodiment, two separated recesses 200 are disposed in the outer regions 301 outboard of both the end nozzles 111*a* in the first direction y of the discharge head 100, respectively. The two separated recesses 200 do not overlap with the inner region 302. In addition, the recess 200 is also opened in the first direction y on a sidewall face 100*b* of the discharge head 100 intersecting the first direction y. The height h of the first wall face 201 of the recess 200 is constant.

Even in such a configuration, the airflow enters the recess 200 and collides with the first wall face 201. Accordingly, the recess airflow is generated to some extent. As a result, the droplet D can be prevented from bending as compared with a discharge head without the recess. The recess 200 does not have the second wall face 202 extending in the second direction x on the sidewall face 100*b*. Accordingly, the discharge head 100 can be shortened in the first direction y to downsize the discharge head 100.

Figure 23:
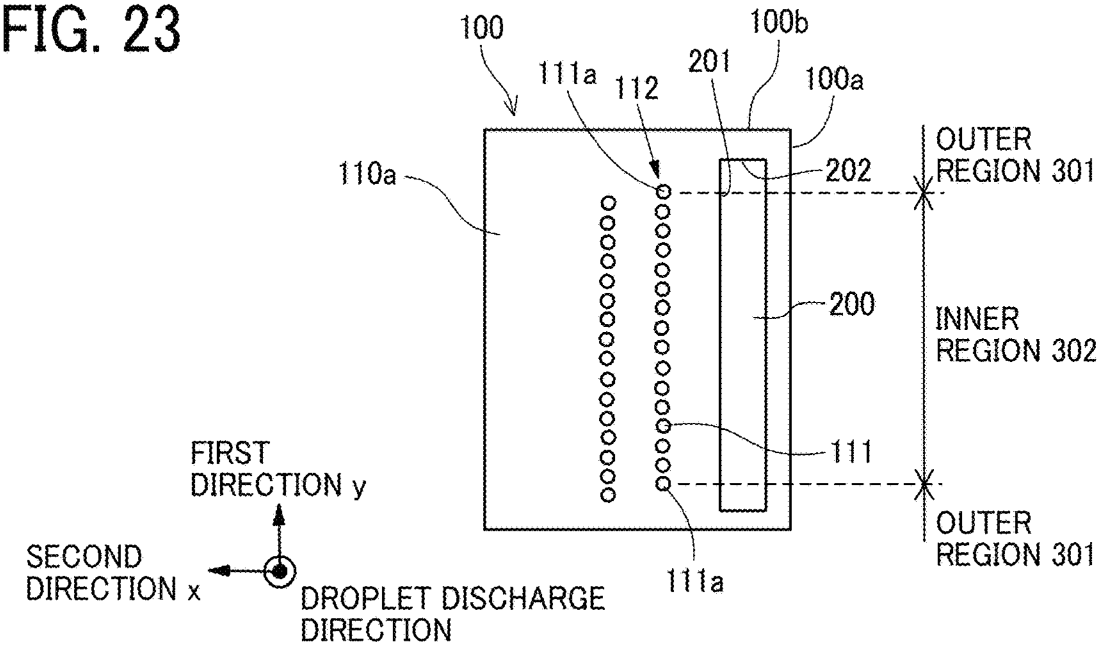
FIG. 23 is a schematic plan view of a discharge head according to a sixth embodiment of the present disclosure as viewed from the nozzle face side thereof.

A discharge head according to a sixth embodiment of the present disclosure is described below with reference to FIG. 23. FIG. 23 is a schematic plan view of the discharge head according to the sixth embodiment as viewed from the nozzle face side thereof.

In a discharge head 100 according to the sixth embodiment, the recess 200 is opened on the nozzle face 110*a* of the discharge head 100 and is not opened on the sidewall faces 100*a* and 100*b* of the discharge head 100.

Even in such a configuration, the airflow enters the recess 200 and collides with the first wall face 201. Accordingly, the recess airflow is generated to some extent. As a result, the droplet D can be prevented from bending as compared with a discharge head without the recess 200.

Similarly to the first embodiment or the second embodiment, the height of the first wall face 201 may gradually decrease from the outer region 301 toward the inner region 302 of the end nozzle 111*a*, and thus, the bending of the droplet D may be further prevented.

Figure 24:
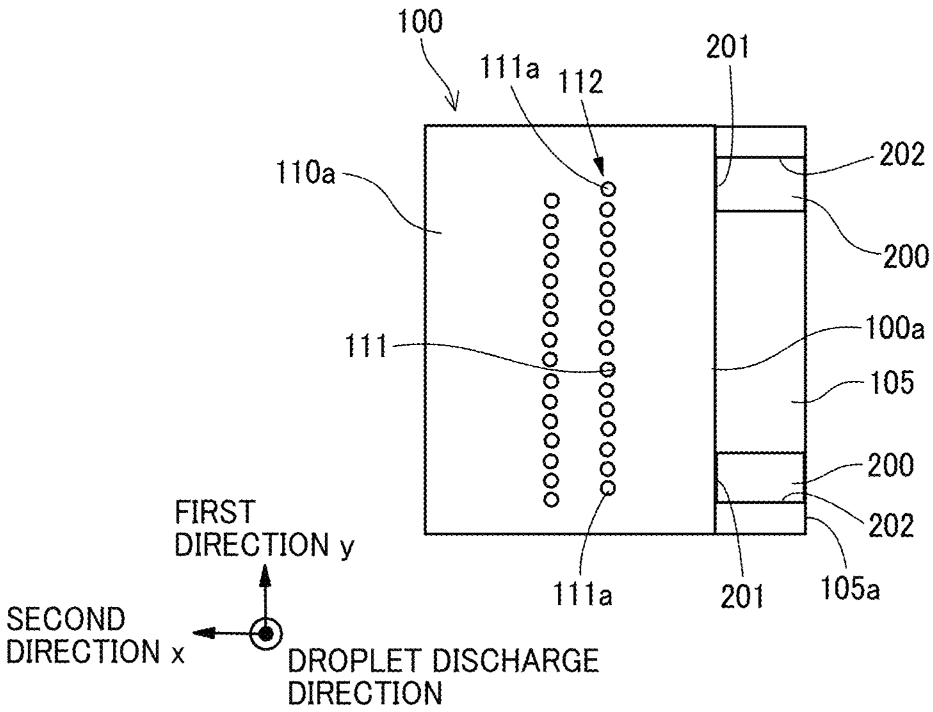
FIG. 24 is a schematic plan view of a discharge head according to a seventh embodiment of the present disclosure as viewed from the nozzle face side thereof.

A discharge head according to a seventh embodiment of the present disclosure is described below with reference to FIG. 24. FIG. 24 is a schematic plan view of the discharge head according to the seventh embodiment as viewed from the nozzle face side thereof.

A discharge head 100 according to the seventh embodiment includes a structure 105 on the sidewall face 100*a* of the discharge head 100. The structure 105 has a recess 200 which is opened on the nozzle face 110*a* of the structure 105 of the discharge head 100 and is opened on a sidewall face 105*a* of the structure 105 in the second direction x, similarly to the second embodiment or the fourth embodiment. The material of the structure 105 may be any material such as resins and metals, and a material suitable for processing the recess 200 may be selected.

Even in such a configuration, the airflow enters the recess 200 and collides with the first wall face 201. Accordingly, the recess airflow is generated by the recess 200, similarly to the recess 200 formed in the body of the discharge head 100. As a result, the droplet D can be prevented from bending.

The structure 105 is formed of a component different from the component forming the nozzle face 110*a*. Thus, a material suitable for forming the recess 200 in the structure 105 can be used. For example, the recess 200 having a curved surface can be formed in the structure 105 made of resin that is easy to be processed. Further, the structure 105 may be a separate component from the component forming the nozzle face 110*a* and may be replaceable. The structure 105 can be replaced when the droplets discharged from the nozzle 111 adhere to the recess 200 and the structure 105 is stained with the droplets. In addition, the structure 105 can be replaced with one suitable for preventing the bending of droplets among various structures 105 having different arrangements or shapes of the recess 200.

The structure 105 may be combined with the discharge head 100 as a single unit. The term “the structure 105 combined with the discharge head 100 as a single unit” includes a structure 105 that is a separate component from the component forming the nozzle face 110*a* and is coupled to the discharge head 100 by any fixing and supporting method. The recess 200 of the structure 105 may have the same shape as the recess 200 according to the first embodiment, the third embodiment, the fifth embodiment, or the sixth embodiment.

Figure 25:
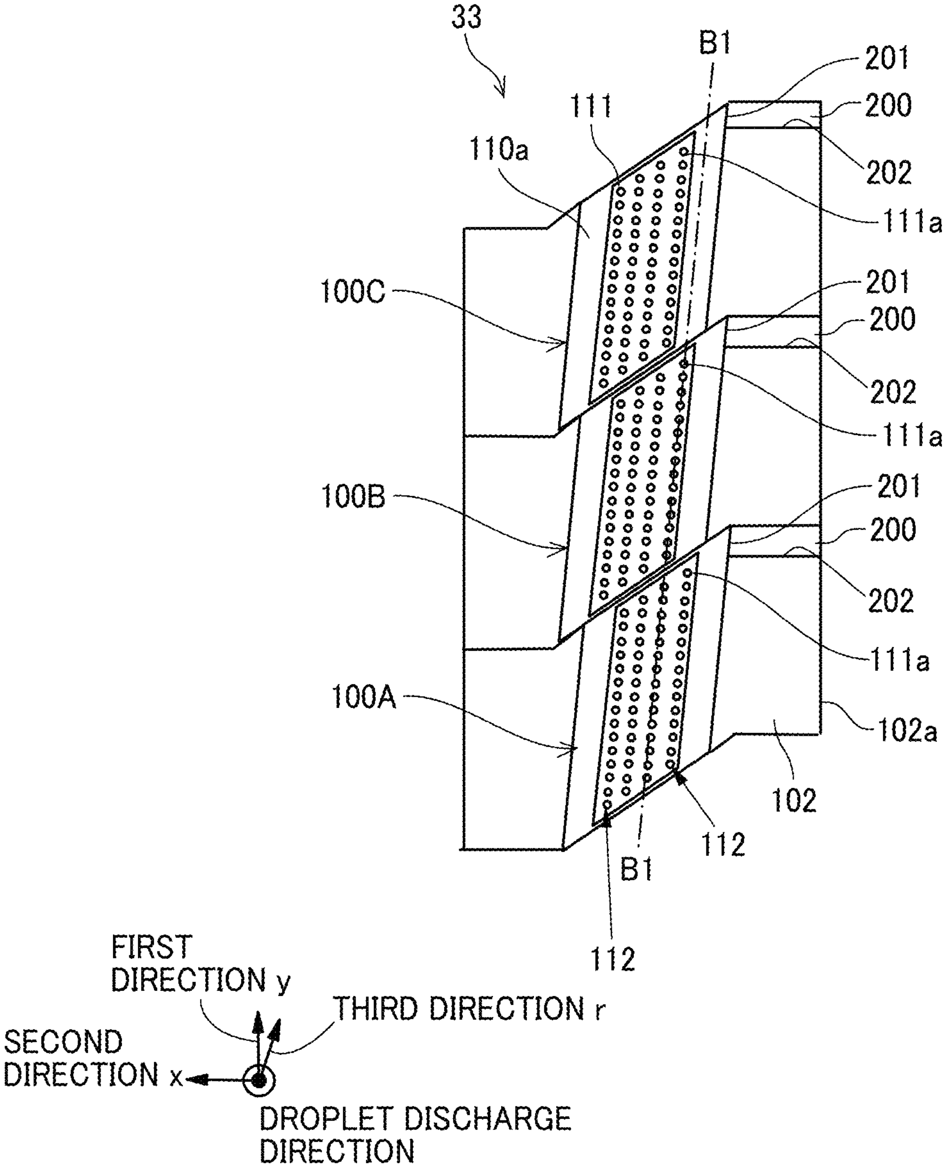
FIG. 25 is a schematic plan view of a discharge head unit according to an eighth embodiment of the present disclosure as viewed from the nozzle face side thereof.

A discharge head unit according to an eighth embodiment of the present disclosure is described below with reference to FIG. 25. FIG. 25 is a schematic plan view of the discharge head unit according to the eighth embodiment as viewed from the nozzle face side thereof.

A discharge head unit 33 according to the eighth embodiment includes three discharge heads 100 (100A, 100B, 100C) held by the corresponding holders 102 and arranged in the first direction y. The discharge head 100 has, for example, four nozzle rows 112 in each of which multiple of nozzles 111 are arrayed in a third direction r intersecting the first direction y.

The third direction r, which is the direction of the nozzle rows 112 (i.e., the nozzle row direction) of the discharge heads 100A, 100B, and 100C, is inclined with respect to the first direction y, which is the arrangement direction of the discharge heads 100. Thus, in the sheet conveyance direction, the end nozzle 111*a* in the most upstream nozzle row 112 among the multiple nozzle rows 112 of each of the discharge heads 100A, 100B, and 100C is the most upstream nozzle 111 in the discharge head 100.

Accordingly, the recess 200 is disposed at the portion of the holder 102 corresponding to the end nozzle 111*a* (i.e., the most upstream nozzle 111) in the most upstream nozzle row 112 of each of the discharge heads 100A, 100B, and 100C in the second direction x, and is opened on the nozzle face 110*a* and on an upstream sidewall face 102*a* of the holder 102 in the second direction x. Thus, the first wall face 201 faces upstream in the second direction x. The recess 200 is disposed in the outer region outboard of the end nozzle 111*a*, as in the fourth embodiment.

A discharge head unit according to a second comparative example is described below with reference to FIGS. 26, 27A, and 27B. FIG. 26 is a schematic plan view of the discharge head unit according to the second comparative example as viewed from the nozzle face side thereof. FIGS. 27A and 27B are graphs each illustrating the velocity Vf of the jet airflow generated by droplets discharged from the discharge head of FIG. 26 at the nozzle position on line B1-B1 and line B2-B2, according to the second comparative example.

A discharge head unit 33 according to the second comparative example has substantially the same configuration as the discharge head unit 33 according to the present embodiment illustrated in FIG. 25 except that the recess 200 according to the present embodiment is not provided.

In a discharge head 100B according to the second comparative example, the velocity Vf of the jet airflow at end nozzles N1 and N2 in the nozzle row 112 on line B1-B1 is illustrated in FIG. 27A, and similarly, the velocity Vf of the jet airflow at end nozzles N3 and N4 in the nozzle row 112 on line B2-B2 is illustrated in FIG. 27B.

The nozzle row 112 is not disposed adjacent to the end nozzle N1 of the discharge head 100B in the adjacent discharge head 100C. Accordingly, the slope of the velocity Vf of the jet airflow is large near the end nozzle N1 as illustrated in FIG. 27A without the jet airflow in the adjacent discharge head 100C. On the other hand, the end nozzle N2 of the discharge head 100B is affected by the most upstream nozzle row 112 of the adjacent discharge head 100A. Accordingly, the slope of the velocity Vf of the jet airflow is small near the end nozzle N2.

The jet airflow is generated by the nozzle row 112 of the discharge head 100C adjacent to the discharge head 100B. Accordingly, the slope of the velocity Vf of the jet airflow is small near the end nozzle N3 of the discharge head 100B as illustrated in FIG. 27B. The end nozzle N4 of the discharge head 100B is affected by the upstream nozzle row 112 of the adjacent discharge head 100A. Accordingly, the slope of the velocity Vf of the jet airflow is small near the end nozzle N4.

Figure 28:
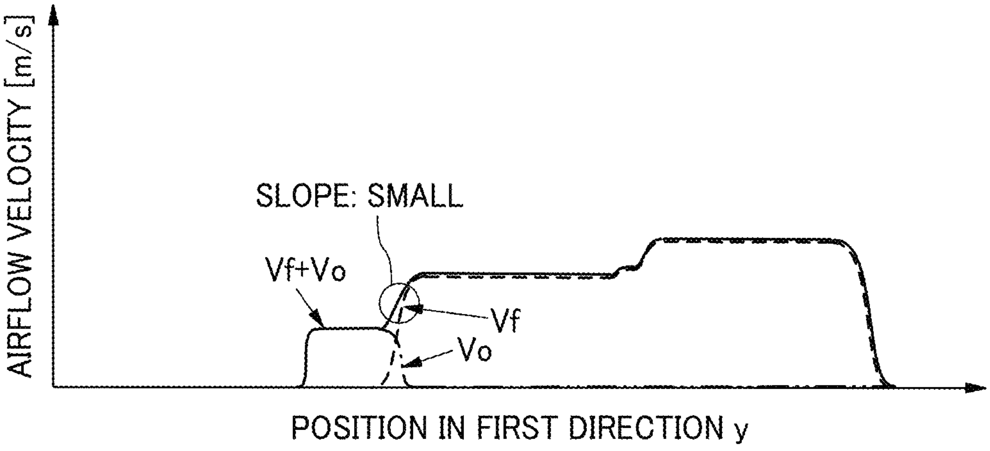
FIG. 28 is a graph illustrating the velocities of a jet airflow, a recess airflow, and a combined airflow thereof at the nozzle position on line B1-B1 of FIG. 25, according to the eighth embodiment.

Effects of the recess 200 according to the present embodiment are described below with reference to FIG. 28. FIG. 28 is a graph illustrating the velocities of the jet airflow, the recess airflow, and the combined airflow thereof at the nozzle position on line B1-B1 of FIG. 25.

In the present embodiment, the recess 200 is disposed at the portion of the holder 102 corresponding to the end nozzle 111*a* (i.e., the most upstream nozzle 111) in the most upstream nozzle row 112 in the second direction x of each of the discharge heads 100A, 100B, and 100C, and is opened on the nozzle face 110*a* and on the upstream sidewall face 102*a* of the holder 102 in the second direction x.

Accordingly, at the nozzle position on line B1-B1, the recess airflow is generated by the recess 200 corresponding to the end nozzle 111*a* of the discharge head 100B. The velocity Vo of the recess airflow increases outward on the discharge head 100B, and the velocity Vf of the jet airflow is not generated on the adjacent discharge head 100C on line B1-B1. Accordingly, as illustrated in FIG. 28, the slope of the velocity (Vf+Vo) of the combined airflow is smaller than the slope of the velocity Vf of the jet airflow alone without the recess airflow.

Accordingly, the difference in the resistance of the relative airflow between on the outward surface and on the inward surface of the droplet D, which is discharged from the end nozzle 111*a* of the nozzle row 112, can be reduced by the recess airflow. As a result, the droplet D can be prevented from bending.

As described with reference to FIGS. 27A and 27B according to the second comparative example, when multiple discharge heads are arranged in the first direction y, the third direction r (i.e., the nozzle row direction) is inclined with respect to the first direction y in each of the multiple discharge heads, and the multiple nozzle rows 112 are arranged in the second direction x intersecting the first direction y, the most upstream nozzle in the most upstream nozzle row in the second direction x of each discharge head is the end nozzle and is disposed at a position where the slope of the distribution of the jet airflow is large.

On the other hand, the nozzle in the most downstream nozzle row in the second direction x of each discharge head is disposed at a position where the slope of the distribution of the jet airflow is small even at the end of the nozzle row due to the jet airflow generated by the second downstream nozzle row.

Accordingly, as in the present embodiment, the recess 200 having the first wall face 201 upstream from the end nozzle 111*a* in the second direction x and outboard of the end nozzle 111*a* in the first direction y, which is the most upstream nozzle in the most upstream nozzle row, can prevent the droplet D from bending.

Figure 29:
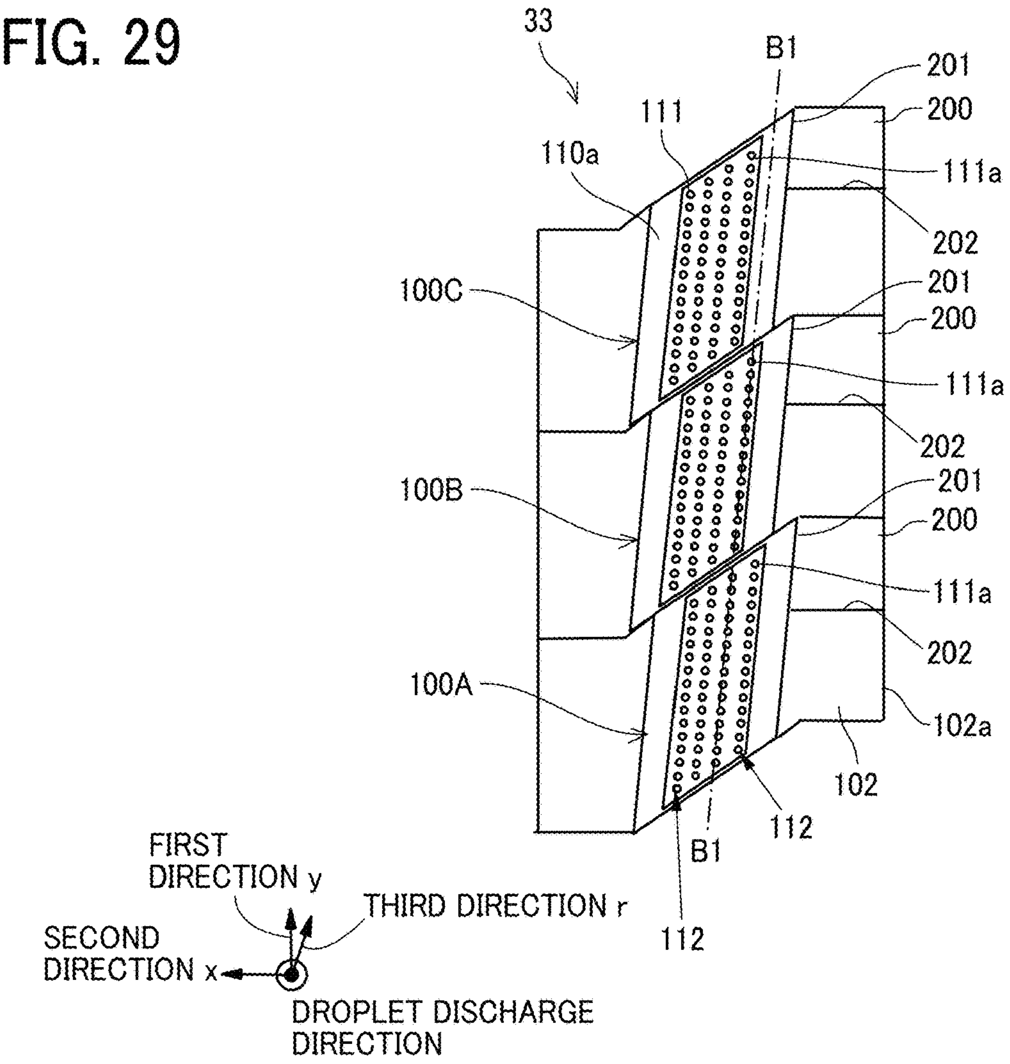
FIG. 29 is a schematic plan view of a discharge head unit according to a ninth embodiment of the present disclosure as viewed from the nozzle face side thereof.

A discharge head unit according to a ninth embodiment of the present disclosure is described below with reference to FIG. 29. FIG. 29 is a schematic plan view of the discharge head unit according to the ninth embodiment as viewed from the nozzle face side thereof.

In a discharge head unit 33 according to the ninth embodiment, the discharge heads 100A to 100C are arranged in the first direction y, as in the eighth embodiment. The recess 200 is disposed at the portion of the holder 102 corresponding to the end nozzle 111*a* (i.e., the most upstream nozzle 111) in the most upstream nozzle row 112 in the second direction x of each of the discharge heads 100A, 100B, and 100C, and is opened on the nozzle face 110*a* and on the upstream sidewall face 102*a* of the holder 102 in the second direction x. In the recess 200, the height of the first wall face 201 gradually decreases from the outer region toward the inner region of the end nozzle 111*a*, as in the second embodiment.

Figure 30:
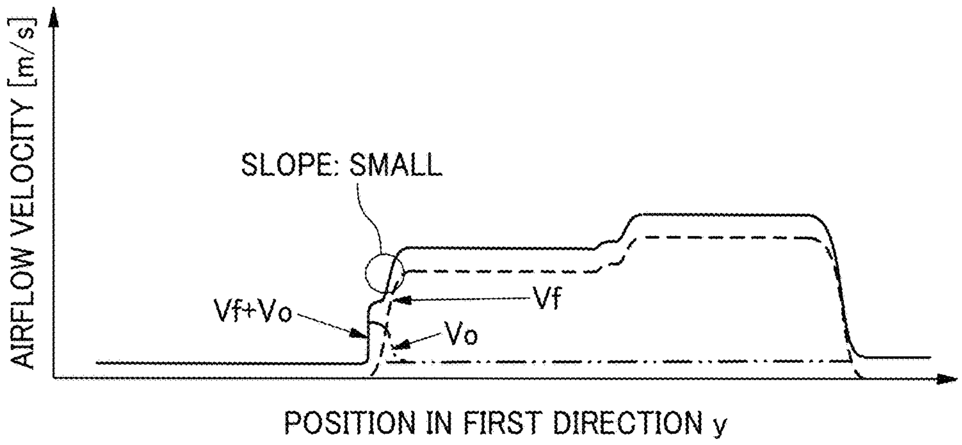
FIG. 30 is a graph illustrating the velocities of a jet airflow, a recess airflow, and a combined airflow thereof at the nozzle position on line B1-B1 of FIG. 29, according to the ninth embodiment.

Effects of the recess 200 according to the present embodiment are described below with reference to FIG. 30. FIG. 30 is a graph illustrating the velocities of the jet airflow, the recess airflow, and the combined airflow thereof at the nozzle position on line B1-B1 of FIG. 29.

In the present embodiment, the first wall face 201 of the recess 200 corresponding to the end nozzle 111*a* in the most upstream nozzle row 112 of each of the discharge heads 100A, 100B, and 100C faces upstream in the second direction x.

Accordingly, at the nozzle position on line B1-B1, the recess airflow is generated by the recess 200 corresponding to the end nozzle 111*a* of the discharge head 100B. The velocity Vo of the recess airflow increases outward on the discharge head 100B, and the velocity Vf of the jet airflow is not generated on the adjacent discharge head 100C on line B1-B1. Accordingly, as illustrated in FIG. 30, the slope of the velocity (Vf+Vo) of the combined airflow is smaller than the slope of the velocity Vf of the jet airflow alone without the recess airflow.

Accordingly, the difference in the resistance of the relative airflow between on the outward surface and on the inward surface of the droplet D, which is discharged from the end nozzle 111*a* of the nozzle row 112, can be reduced by the recess airflow. As a result, the droplet D can be prevented from bending.

Figure 31:
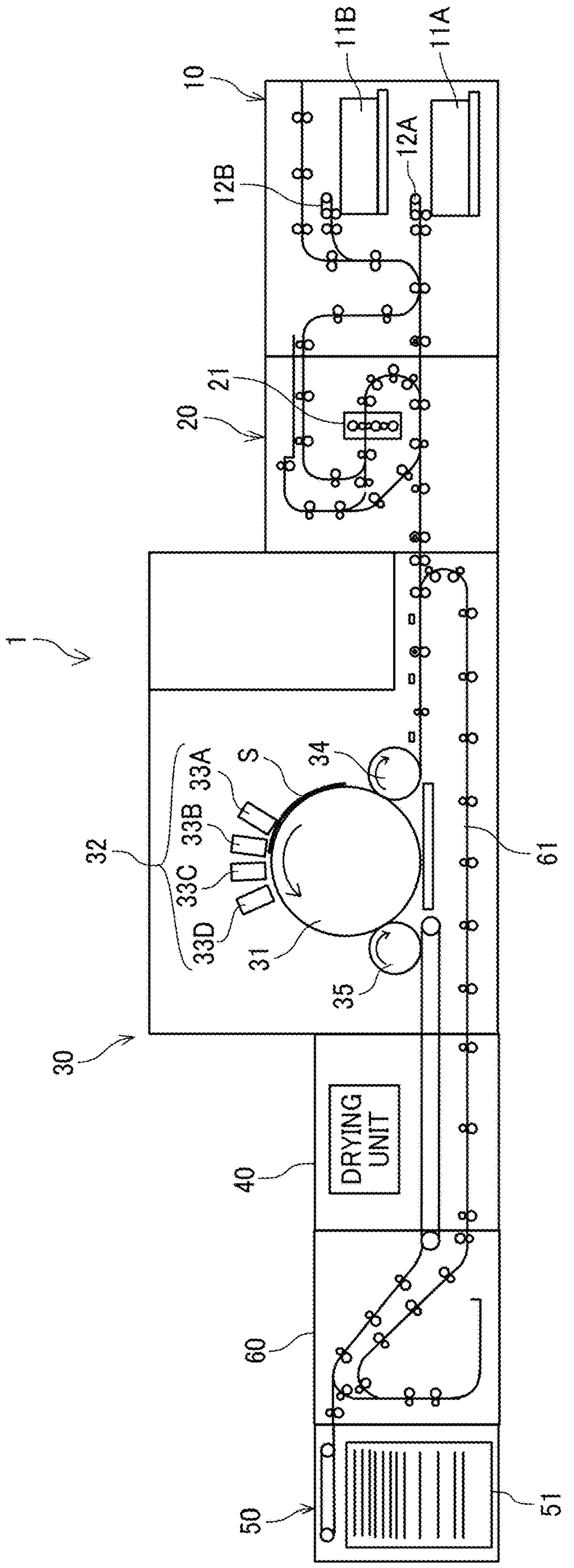
FIG. 31 is a schematic view of a printer as a discharge apparatus according to a tenth embodiment of the present disclosure.

A discharge apparatus according to a tenth embodiment of the present disclosure is described below with reference to FIG. 31. FIG. 31 is a schematic view of the discharge apparatus according to the tenth embodiment.

A printer 1 as the discharge apparatus according to the tenth embodiment includes a loading unit 10 to load a sheet S into the printer 1, a pretreatment unit 20, a printing unit 30, a drying unit 40, a reverse unit 60, and an ejection unit 50.

In the printer 1, the pretreatment unit 20 applies, if desired, a pretreatment liquid onto the sheet S forwarded (supplied) from the loading unit 10, the printing unit 30 applies a liquid (e.g., ink) to the sheet S to perform desired printing, the drying unit 40 dries the liquid adhering to the sheet S, and the sheet S is ejected to the ejection unit 50.

The loading unit 10 includes a lower loading tray 11A and an upper loading tray 11B to accommodate multiple sheets S and feeding units 12A and 12B to separate and forward the sheets S one by one from the lower and upper loading trays 11A and 11B, and supplies the sheets S to the pretreatment unit 20.

The pretreatment unit 20 includes, e.g., a coater 21 as a treatment-liquid application unit that coats a printing surface of the sheet S with a treatment liquid having an effect of aggregation of ink particles to prevent bleed-through.

The printing unit 30 includes a drum 31 and a liquid discharge device 32. The drum 31 is a bearer (rotator) that bears the sheet S on a circumferential surface of the drum 31 and rotates to convey the sheet S (i.e., the drum 31 servers as a conveyor). The liquid discharge device 32 discharges the liquid toward the sheet S borne on the drum 31.

The printing unit 30 further includes transfer cylinders 34 and 35. The transfer cylinder 34 receives the sheet S from the pretreatment unit 20 and forwards the sheet S to the drum 31. The transfer cylinder 35 receives the sheet S conveyed by the drum 31 and forwards the sheet S to the drying unit 40.

The transfer cylinder 34 includes a sheet gripper to grip a leading end of the sheet S conveyed from the pretreatment unit 20 to the printing unit 30. The sheet S thus gripped is conveyed as the transfer cylinder 34 rotates. The transfer cylinder 34 forwards the sheet S to the drum 31 at a position opposite the drum 31.

Similarly, the drum 31 includes a sheet gripper on the surface of the drum 31, and the leading end of the sheet S is gripped by the sheet gripper of the drum 31. The drum 31 has a plurality of suction holes dispersedly on the surface of the drum 31, and a suction unit generates suction airflows directed inward from desired suction holes of the drum 31.

On the drum 31, the sheet gripper grips the leading end of the sheet S forwarded from the transfer cylinder 34, and the sheet S is attracted to and borne on the drum 31 by the suction airflows by the suction unit. As the drum 31 rotates, the sheet S is conveyed.

The liquid discharge device 32 includes discharge head units 33 (discharge head units 33A to 33D) to discharge liquids. For example, the discharge head unit 33A discharges a liquid of cyan (C), the discharge head unit 33B discharges a liquid of magenta (M), the discharge head unit 33C discharges a liquid of yellow (Y), and the discharge head unit 33D discharges a liquid of black (K). Further, the liquid discharge device 32 may include a discharge head unit 33 that discharges special liquid, i.e., liquid of spot color such as white, gold, or silver.

The discharge head unit 33 is, for example, a full-line head having the same configuration as the discharge head unit 33 according to the eighth embodiment or the ninth embodiment. As the discharge head unit 33, for example, a full-line head in which the discharge heads according to any of the first to seventh embodiments are arranged in a staggered manner may be used.

A discharge operation of each of the discharge head units 33 of the liquid discharge device 32 is controlled by a drive signal corresponding to print data. When the sheet S borne on the drum 31 passes through a region facing the liquid discharge device 32, the liquids of respective colors are discharged from the discharge head units 33, and an image corresponding to the print data is formed on the sheet S.

The sheet S moves relative to the liquid discharge device 32, and the relative movement direction is a direction in which the sheet S passes through the region facing the liquid discharge device 32 (i.e., the second direction x). The relative movement direction corresponds to the rotation direction of the drum 31 indicated by arrows illustrated in FIG. 31. The upstream side of the relative movement direction of the sheet S (upstream side of the second direction x) is the upstream side of the rotation direction of the drum 31, and corresponds to the right side of the liquid discharge device 32 in FIG. 31.

The drying unit 40 dries the liquid applied onto the sheet S by the printing unit 30. Thus, a liquid component such as moisture in the liquid evaporates, and the colorant contained in the liquid is fixed on the sheet S. Additionally, curling of the sheet S is reduced.

The reverse unit 60 reverses, in switchback manner, the sheet S that has passed through the drying unit 40 in duplex printing. The reversed sheet S is fed back to the upstream side of the transfer cylinder 34 through a conveyance passage 61 of the printing unit 30.

The ejection unit 50 includes an ejection tray 51 on which multiple sheets S are stacked. The multiple sheets S conveyed through the reverse unit 60 from the drying unit 40 are sequentially stacked and held on the ejection tray 51.

Figure 32:
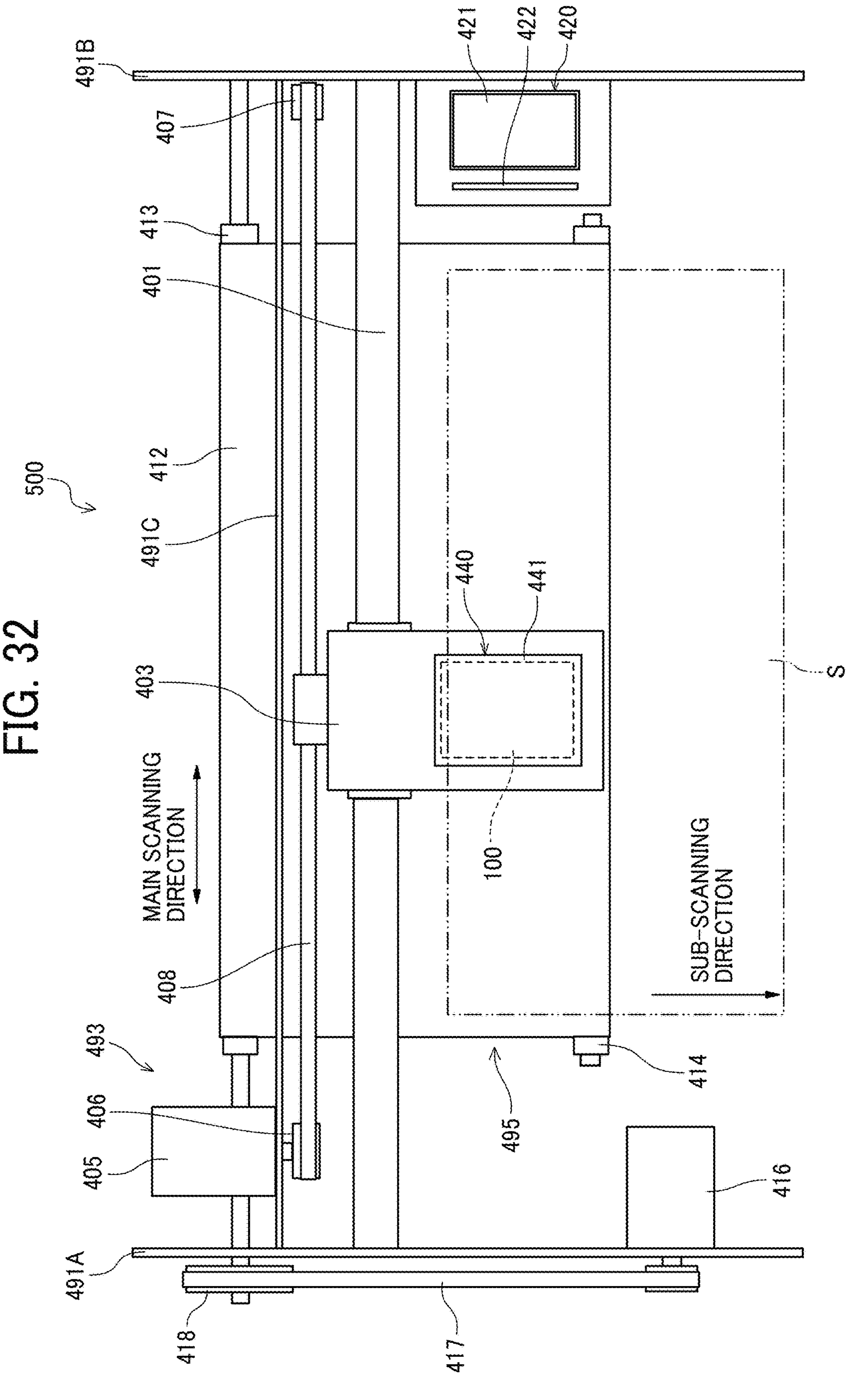
FIG. 32 is a schematic plan view of a part of a printer as a discharge apparatus according to an eleventh embodiment of the present disclosure.
Figure 33:
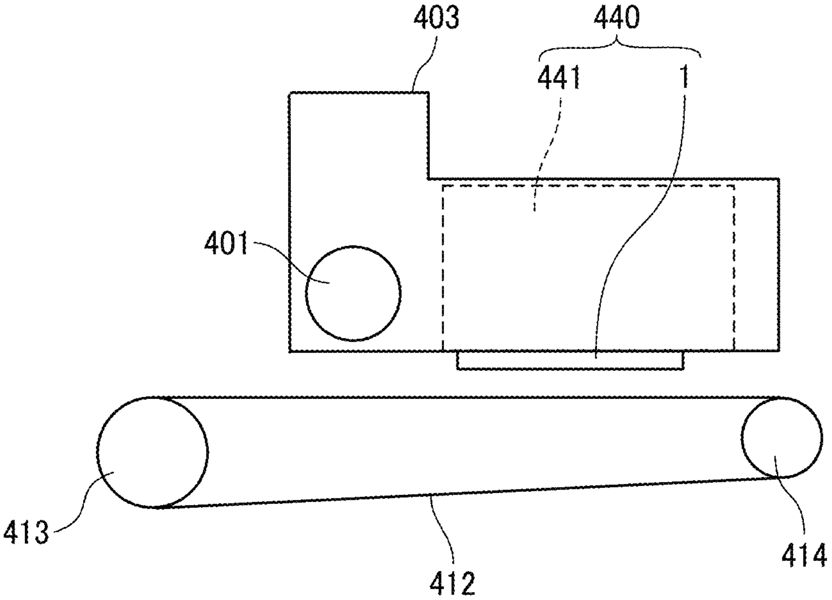
FIG. 33 is a schematic front view of the part of the printer of FIG. 32.

A discharge apparatus according to an eleventh embodiment of the present disclosure is described below with reference to FIGS. 32 and 33. FIG. 32 is a schematic plan view of a part of a printer as the discharge apparatus according to the eleventh embodiment. FIG. 33 is a schematic front view of the part of the printer of FIG. 32.

A printer 500 according to the eleventh embodiment is a serial type apparatus, and a main-scanning moving mechanism 493 reciprocally moves a carriage 403 in a main scanning direction. The main-scanning moving mechanism 493 includes, for example, a guide 401, a main-scanning motor 405, and a timing belt 408. The guide 401 is bridged between left and right side plates 491A and 491B to moveably hold the carriage 403. The main-scanning motor 405 reciprocates the carriage 403 in the main scanning direction via the timing belt 408 looped around a drive pulley 406 and a driven pulley 407.

The carriage 403 mounts a liquid discharge unit 440 including the discharge head 100 according to the above-described embodiments of the present disclosure and a head tank 441 as a single integrated unit. The liquid discharge unit 440 may include the discharge head unit 33 according to the above-described embodiments of the present disclosure. The discharge head 100 of the liquid discharge unit 440 discharges liquids of different colors, for example, yellow (Y), cyan (C), magenta (M), and black (K).

The printer 500 includes a conveyance mechanism 495 to convey a sheet S. The conveyance mechanism 495 includes a conveyance belt 412 as a conveyor and a sub-scanning motor 416 to drive the conveyance belt 412. The conveyance belt 412 attracts the sheet S and conveys the sheet S to a position facing the discharge head 100. The conveyance belt 412 is an endless belt stretched between a conveyance roller 413 and a tension roller 414.

The sheet S can be attracted to the conveyance belt 412 by, for example, electrostatic attraction or air suction. The conveyance belt 412 circumferentially moves in a sub-scanning direction as the conveyance roller 413 is rotationally driven by the sub-scanning motor 416 via a timing belt 417 and a timing pulley 418.

On one end of the range of movement of the carriage 403 in the main scanning direction, a maintenance mechanism 420 that maintains and recovers the discharge head 100 is disposed lateral to the conveyance belt 412.

The maintenance mechanism 420 includes, for example, a cap 421 to cap the nozzle face (i.e., the surface on which the nozzles 4 are formed) of the discharge head 100 and a wiper 422 to wipe the nozzle face.

The main-scanning moving mechanism 493, the maintenance mechanism 420, and the conveyance mechanism 495 are mounted onto a housing including the side plates 491A and 491B and a back plate 491C.

In the printer 500 having the above-described configuration, the sheet S is fed and attracted onto the conveyance belt 412 and conveyed in the sub-scanning direction (first direction y) by the circumferential movement of the conveyance belt 412.

The discharge head 100 is driven in response to an image signal while the carriage 403 moves in the main scanning direction to discharge liquid onto the sheet S not in motion. As a result, an image is formed on the sheet S.

The discharge head 100 mounted on the carriage 403 moves in the main scanning direction (second direction x) relative to the sheet S. In other words, the sheet S, which is actually not in motion, moves relative to the discharge head 100 in the main scanning direction (second direction x). The upstream of the relative movement of the sheet S relative to the discharge head 100 corresponds to the downstream of the movement of the discharge head 100 by the carriage 403.

The carriage 403 may reciprocate in the main scanning direction in FIG. 32 while the discharge head 100 discharges liquid. In this case, the downstream of each of the backward and forward movements of the carriage 403 in the main scanning direction corresponds to the upstream of the relative movement of the sheet S in the second direction x.

In the present disclosure, the material to be discharged is not limited to a particular material as long as the material has a viscosity or surface tension to be discharged from a head (discharge head). However, preferably, the viscosity of the material is not greater than 30 millipascal-seconds (mPa's) under ordinary temperature and ordinary pressure or by heating or cooling. Examples of the material to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "discharge apparatus" used herein also represents an apparatus including the discharge head unit to drive the discharge head to discharge liquid. The term "discharge apparatus" used here includes, in addition to apparatuses to discharge liquid to a medium onto which liquid can adhere, apparatuses to discharge the liquid into gas (air) or liquid.

The "discharge apparatus" may further include devices relating to feeding, conveying, and ejecting of the medium onto which liquid can adhere and also include a pretreatment device and an aftertreatment device.

The "discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "discharge apparatus" is not limited to an apparatus that discharges liquid to visualize meaningful images such as letters or figures. For example, the discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "discharge apparatus" may be an apparatus to relatively move the discharge head and the medium onto which liquid (i.e., a material to be discharged) can adhere. However, the discharge apparatus is not limited to such an apparatus. For example, the discharge apparatus may be a serial head apparatus that moves the discharge head or a line head apparatus that does not move the discharge head.

Examples of the discharge apparatus further include: a treatment liquid applying apparatus that discharges a treatment liquid onto a surface of a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

Aspects of the present disclosure are, for example, as follows.

Aspect 1

A discharge head includes a nozzle row in which multiple nozzles to discharge a liquid are arrayed in a first direction and a recess opened to a nozzle face on which the nozzle row is arranged. An upstream side in a relative movement direction of an application object to which the liquid is applied when the application object moves relative to the multiple nozzles in a second direction intersecting the first direction is defined as an upstream side in the second direction. The recess is disposed on the upstream side in the second direction relative to the nozzle row. The recess has a first wall face facing the upstream side in the second direction. The recess is disposed from an outer region outside the nozzle at least at one end of the nozzle row to at least a part of an inner region inside the nozzle at the end in the first direction. A height of the first wall face from the nozzle face in the outer region is higher than a height of the first wall face from the nozzle face in the inner region.

In other words, a discharge head includes multiple nozzles and a recess. The multiple nozzles are arrayed in a first direction on a nozzle face of the discharge head to define a nozzle row. A liquid is dischargeable from the multiple nozzles in a discharge direction intersecting the first direction. The recess is recessed from the nozzle face in a second direction opposite to the discharge direction. The recess is disposed at one side of the nozzle row in a third direction intersecting each of the first direction and the second direction. The recess has a wall face extending in the first direction and the second direction. The wall face is disposed between the nozzle row and a side face of the discharge head in the third direction. The discharge head has an inner region in which the multiple nozzles are arrayed and an outer region outside the inner region in the first direction. The recess covers a boundary region between the inner region and the outer region in the first direction. The wall face has a first height from the nozzle face in the outer region in the second direction and a second height lower than the first height from the nozzle face in the inner region in the second direction.

Aspect 2

In the discharge head according to Aspect 1, the height of the first wall face from the nozzle face in the second direction gradually changes (decreases) from the outer region toward the inner region in the first direction.

Aspect 3

In the discharge head according to Aspect 1, the height of the first wall face from the nozzle face in the second direction changes (decreases) stepwise between the outer region and the inner region in the first direction.

Aspect 4

In the discharge head according to any one of Aspects 1 to 3, the recesses are separately disposed at both ends in the first direction.

In other words, the recess is disposed separately at each of both ends of the nozzle row in the first direction.

Aspect 5

In the liquid discharge head according to any one of Aspects 1 to 3, the recess is disposed from the outer region outside the nozzle at the one end of the nozzle row to the outer region outside the nozzle at the other end of the nozzle row.

In other words, the recess covers the inner region and a part of outer region in the first direction.

Aspect 6

A discharge head includes a nozzle row in which multiple nozzles to discharge a liquid are arrayed in a first direction and a recess opened to a nozzle face on which the nozzle row is arranged. An upstream side in a relative movement direction of an application object to which the liquid is applied when the application object moves relative to the multiple nozzles in a second direction intersecting the first direction is defined as an upstream side in the second direction. The recess is disposed on the upstream side in the second direction relative to the nozzle row. The recess has a first wall face facing the upstream side in the second direction. The recess is disposed in an outer region outside the nozzle of at least at one end of the nozzle row.

In other words, a discharge head includes a nozzle row and recesses. The multiple nozzles are arrayed in a first direction on a nozzle face of the discharge head to define a nozzle row. A liquid is dischargeable from the multiple nozzles in a discharge direction intersecting the first direction. The recesses are recessed from the nozzle face in a second direction opposite to the discharge direction. The recesses are disposed at one side of the nozzle row in a third direction intersecting each of the first direction and the second direction. The recesses are disposed at both end parts of the discharge head in the first direction. Each of the recesses has a wall face extending in the first direction and the second direction. The wall face is disposed between the nozzle row and a side face of the discharge head in the third direction. The discharge head has an inner region in which the multiple nozzles are arrayed and an outer region outside the inner region in the first direction. Each of the recesses covers a part of the outer region and does not cover the inner region in the first direction.

Aspect 7

In the discharge head according to Aspect 6, the recess has a second wall face intersecting the first direction.

In other words, each of the recesses has another wall face extending in the second direction and the third direction.

Aspect 8

In the discharge head according to Aspect 7, a distance between the second wall face of the recess on the side of the nozzle at the end and the nozzle at the end in the first direction is equal to or less than an arrangement interval of the nozzles in the first direction.

In other words, a distance between said another wall face of the recesses and an end nozzle of the multiple nozzles adjacent to said another wall face in the first direction is equal to or less than an interval between the multiple nozzles in the first direction.

Aspect 9

In the discharge head according to any one of Aspects 1 to 8, the recess is opened toward the upstream side in the second direction.

In other words, the recess is opened toward the side face of the discharge head in the third direction.

Aspect 10

In the discharge head according to any one of Aspects 1 to 9, the recess is provided in a structure integrally provided in the discharge head.

In other words, the discharge head according to any one of Aspects 1 to 9, further includes a body having the multiple nozzles and a structure on a side face of the body. The structure and the body form a single unit. The structure has the recess.

Aspect 11

A discharge head unit includes multiple discharge heads and a recess. The multiple discharge heads each including a nozzle row in which multiple nozzles to discharge a liquid are arrayed in a third direction are arranged in a first direction. An upstream side in a relative movement direction of an application object to which the liquid is applied when the application object moves relative to the multiple nozzles in a second direction intersecting the first direction is defined as an upstream side in the second direction. The nozzle at one end of the nozzle row of the discharge head is positioned on the upstream side in the second direction relative to the nozzle at the other end. The recess is disposed in an outer region outside the nozzle at the one end of the nozzle row of the discharge head and opened to a nozzle face on which the nozzle row is arranged. The recess has a first wall face disposed on the upstream side in the second direction relative to the nozzle at the one end and facing the upstream side in the second direction.

In other words, a discharge head unit includes multiple discharge heads arrayed in a first direction and a recess. Each of the multiple discharge heads includes multiple nozzles arrayed in a second direction intersecting the first direction on a nozzle face of each of the multiple discharge heads to define a nozzle row. The recess is recessed from the nozzle face in a third direction intersecting the first direction and the second direction in each of the multiple discharge heads. The recess is disposed at one side of the nozzle row in a fourth direction intersecting each of the first direction, the second direction, and the third direction. The recess has a wall face extending in the second direction and the third direction. The wall face is disposed between the nozzle row and a side face of each of the multiple discharge heads in the fourth direction. Each of the discharge heads has an inner region in which the multiple nozzles are arrayed and an outer region outside the inner region in the first direction. The recess covers at least a part of the outer region.

Aspect 12

A discharge head unit includes multiple discharge heads and a recess. The multiple discharge heads each including a nozzle row in which multiple nozzles to discharge a liquid are arrayed in a third direction are arranged in a first direction. An upstream side in a relative movement direction of an application object to which the liquid is applied when the application object moves relative to the multiple nozzles in a second direction intersecting the first direction is defined as an upstream side in the second direction. The nozzle at one end of the nozzle row of the discharge head is positioned on the upstream side in the second direction relative to the nozzle at the other end. The recess is disposed from an outer region outside the nozzle at the one end of the nozzle row of the discharge head to an inner region inside the nozzle at the one end and opened to a nozzle face on which the nozzle row is arranged. The recess has a first wall face disposed on the upstream side in the second direction relative to the nozzle at the one end and facing the upstream side in the second direction.

Aspect 13

In the discharge head unit according to Aspect 11 or 12, the recess is opened toward the upstream side in the second direction.

In other words, the recess is opened toward the side face of each of the multiple discharge heads in the fourth direction.

Aspect 14

A discharge apparatus includes the discharge head according to any one of Aspects 1 to 10.

In other words, a discharge apparatus includes the discharge head according to any one of Aspects 1 to 10 and a conveyor to convey an object to the discharge head in a conveyance direction opposite to the third direction to apply the liquid onto the object by the discharge head. The recess is (recesses are) disposed upstream from the nozzle row in the conveyance direction. In addition, the recess is opened upstream in the conveyance direction.

Alternatively, a discharge apparatus includes the discharge head according to any one of Aspects 1 to 10 and a main-scanning mechanism to move the discharge head relative to an object in the third direction to apply the liquid onto the object by the discharge head. The recess is (recesses are) disposed downstream from the nozzle row in the third direction. In addition, the recess is opened downstream in the third direction.

Aspect 15

A discharge apparatus includes the discharge head unit according to any one of Aspects 11 to 13.

In other words, a discharge apparatus includes the discharge head unit according to any one of aspects 11 to 13 and a conveyor to convey an object to the discharge head unit in a conveyance direction opposite to the fourth direction to apply a liquid onto the object by the discharge head. The recess is disposed upstream from the nozzle row in the conveyance direction. In addition, the recess is opened upstream in the conveyance direction.

Aspect 16

A printer includes the discharge apparatus according to Aspect 14.

In other words, a printer includes the discharge apparatus according to Aspect 14 and a maintenance mechanism to maintain and recover the discharge head.

Aspect 17

A printer includes the discharge apparatus according to Aspect 15.

In other words, a printer includes the discharge apparatus according to Aspect 15 and a maintenance mechanism to maintain and recover the discharge head unit.

According to one aspect of the present disclosure, droplets discharged from the end nozzle in the nozzle row can be prevented from bending.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A discharge head comprising:

multiple nozzles arrayed in a first direction on a nozzle face of the discharge head to define a nozzle row, the multiple nozzles from which a liquid is dischargeable in a discharge direction intersecting the first direction; and a recess:

recessed from the nozzle face in a second direction opposite to the discharge direction; and disposed at one side of the nozzle row in a third direction intersecting each of the first direction and the second direction, the recess having a wall face:

extending in the first direction and the second direction; and disposed between the nozzle row and a side face of the discharge head in the third direction, wherein the discharge head has:

an inner region in which the multiple nozzles are arrayed; and an outer region outside the inner region in the first direction, the recess covers a boundary region between the inner region and the outer region in the first direction, and the wall face has:

a first height from the nozzle face in the outer region in the second direction; and a second height lower than the first height from the nozzle face in the inner region in the second direction.

2. The discharge head according to claim 1, wherein a height of the wall face from the nozzle face in the second direction gradually decreases from the outer region toward the inner region in the first direction.

3. The discharge head according to claim 1, wherein a height of the wall face from the nozzle face in the second direction decreases stepwise between the outer region and the inner region in the first direction.

4. The discharge head according to claim 1, wherein the recess is disposed separately at each of both ends of the nozzle row in the first direction.

5. The discharge head according to claim 1, wherein the recess covers the inner region and a part of outer region in the first direction.

6. The discharge head according to claim 1, wherein the recess is opened toward the side face of the discharge head in the third direction.

7. The discharge head according to claim 1, further comprising:

a body having the multiple nozzles; and a structure on a side face of the body, wherein the structure and the body form a single unit, and the structure has the recess.

8. A discharge apparatus comprising:

the discharge head according to claim 1; and a conveyor to convey an object to the discharge head in a conveyance direction opposite to the third direction to apply the liquid onto the object by the discharge head, wherein the recess is disposed upstream from the nozzle row in the conveyance direction.

9. The discharge apparatus according to claim 8, wherein the recess is opened upstream in the conveyance direction.

10. A printer comprising:

the discharge apparatus according to claim 8; and a maintenance mechanism to maintain and recover the discharge head.

11. A discharge apparatus comprising:

the discharge head according to claim 1; and a main-scanning moving mechanism to move the discharge head relative to an object in the third direction while applying the liquid onto the object by the discharge head, wherein the recess is disposed downstream from the nozzle row in the third direction.

12. A discharge head comprising:

multiple nozzles arrayed in a first direction on a nozzle face of the discharge head to define a nozzle row, the multiple nozzles from which a liquid is dischargeable in a discharge direction intersecting the first direction; and recesses:

recessed from the nozzle face in a second direction opposite to the discharge direction;

disposed at one side of the nozzle row in a third direction intersecting each of the first direction and the second direction; and disposed at both end parts of the discharge head in the first direction, each of the recesses having a wall face:

extending in the first direction and the second direction; and disposed between the nozzle row and a side face of the discharge head in the third direction, wherein the discharge head has:

an inner region in which the multiple nozzles are arrayed; and an outer region outside the inner region in the first direction, and each of the recesses cover a part of the outer region and does not cover the inner region in the first direction.

13. The discharge head according to claim 12, wherein each of the recesses has another wall face extending in the second direction and the third direction.

14. The discharge head according to claim 13, wherein a distance between said another wall face of the recesses and an end nozzle of the multiple nozzles adjacent to said another wall face in the first direction is equal to or less than an interval between the multiple nozzles in the first direction.

15. A discharge apparatus comprising:

the discharge head according to claim 12; and a conveyor to convey an object to the discharge head in a conveyance direction opposite to the third direction to apply the liquid onto the object by the discharge head, wherein the recesses are disposed upstream from the nozzle row in the conveyance direction.

16. A discharge apparatus comprising:

the discharge head according to claim 12; and a main-scanning moving mechanism to move the discharge head relative to an object in the third direction while applying the liquid onto the object by the discharge head, wherein the recesses are disposed downstream from the nozzle row in the third direction.

17. A discharge head unit comprising:

multiple discharge heads arrayed in a first direction, each of the multiple discharge heads including multiple nozzles arrayed in a second direction intersecting the first direction on a nozzle face of each of the multiple discharge heads to define a nozzle row;

a recess:

recessed from the nozzle face in a third direction intersecting the first direction and the second direction in each of the multiple discharge heads; and disposed at one side of the nozzle row in a fourth direction intersecting each of the first direction, the second direction, and the third direction, the recess having a wall face:

extending in the second direction and the third direction; and disposed between the nozzle row and a side face of each of the multiple discharge heads in the fourth direction, wherein each of the multiple discharge heads has:

an inner region in which the multiple nozzles are arrayed; and an outer region outside the inner region in the first direction, the recess covers at least a part of the outer region in the first direction.

18. The discharge head unit according to claim 17, wherein the recess is opened toward the side face of each of the multiple discharge heads in the fourth direction.

19. A discharge apparatus comprising:

the discharge head unit according to claim 17; and a conveyor to convey an object to the discharge head unit in a conveyance direction opposite to the fourth direction to apply a liquid onto the object by the multiple discharge heads, wherein the recess is disposed upstream from the nozzle row in the conveyance direction.

20. The discharge apparatus according to claim 19, wherein the recess is opened upstream in the conveyance direction.

* * * * *